United States Patent [19]

Matsuda et al.

[11] Patent Number: 5,424,015
[45] Date of Patent: Jun. 13, 1995

[54] METHOD AND DEVICE FOR MANUFACTURING RUBBER BEND PIPE

[75] Inventors: Nobuya Matsuda; Kohji Chida; Shigeki Toyoda; Hiroyuki Awaji; Tetsuo Hasegawa; Kenji Shimizu, all of Saitama; Seishiroh Sugie, Aichi, all of Japan

[73] Assignee: Yamashita Rubber Kabushiki Kaisha, Saitama, Japan

[21] Appl. No.: 125,178

[22] Filed: Sep. 23, 1993

[30] Foreign Application Priority Data

Sep. 29, 1992 [JP] Japan .................. 4-283711
Sep. 29, 1992 [JP] Japan .................. 4-283712
Sep. 29, 1992 [JP] Japan .................. 4-283713
Sep. 29, 1992 [JP] Japan .................. 4-283714

[51] Int. Cl.⁶ .............. B29C 33/58; B29C 53/08
[52] U.S. Cl. .................... 264/130; 29/262; 29/282; 264/134; 264/297.5; 264/297.8; 264/334; 264/339; 425/90; 425/341; 425/392; 425/403.1; 425/436 RM
[58] Field of Search ............ 264/130, 134, 297.5, 264/297.8, 319, 334, 339; 425/90, 340, 341, 392, 393, 403.1, 438, 436 R, 436 RM; 29/252, 255, 262, 282

[56] References Cited

U.S. PATENT DOCUMENTS

| | | | |
|---|---|---|---|
| 2,366,853 | 1/1945 | Greene | 425/393 |
| 3,787,950 | 1/1974 | Bagby | 29/255 |
| 3,857,158 | 12/1974 | Costello | 29/252 |
| 3,925,874 | 12/1975 | Moyers | 29/282 |
| 4,134,784 | 1/1979 | Badberg et al. | 425/393 |
| 4,500,485 | 2/1985 | Williemsen et al. | 264/339 |
| 4,537,736 | 8/1985 | Peltzman et al. | 264/339 |
| 4,801,419 | 1/1989 | Ward et al. | 425/393 |
| 4,847,094 | 7/1989 | Parmann | 425/393 |
| 5,194,208 | 3/1993 | Monthey et al. | 264/130 |

FOREIGN PATENT DOCUMENTS

| | | | |
|---|---|---|---|
| 2140956 | 3/1973 | Germany . | |
| 2420937 | 12/1974 | Germany | 425/392 |
| 3042167 | 6/1982 | Germany | 425/393 |
| 59-83523 | 6/1984 | Japan . | |
| 59-87928 | 6/1984 | Japan . | |
| 59-102323 | 7/1984 | Japan . | |
| 59-33632 | 9/1984 | Japan . | |
| 60-2901 | 1/1985 | Japan . | |
| 60-2902 | 1/1985 | Japan . | |
| 60-56520 | 4/1985 | Japan . | |
| 60-15411 | 10/1985 | Japan . | |
| 61-67117 | 5/1986 | Japan . | |
| 61-135620 | 8/1986 | Japan . | |
| 61-160919 | 10/1986 | Japan . | |
| 62-41516 | 3/1987 | Japan . | |
| 63-33910 | 3/1988 | Japan . | |
| 63-56603 | 4/1988 | Japan . | |
| 63-70307 | 5/1988 | Japan . | |
| 63-82510 | 5/1988 | Japan . | |
| 63-128008 | 8/1988 | Japan . | |
| 1-86506 | 6/1989 | Japan . | |
| 2-36422 | 3/1990 | Japan . | |
| 2-32411 | 9/1990 | Japan . | |
| 3-12491 | 3/1991 | Japan . | |
| 3-29316 | 3/1991 | Japan . | |
| 3-18170 | 4/1991 | Japan . | |
| 3-39516 | 4/1991 | Japan . | |
| 3-66732 | 6/1991 | Japan . | |
| 3-259939 | 6/1991 | Japan . | |
| 3-44488 | 9/1991 | Japan . | |
| 3-51133 | 10/1991 | Japan . | |
| 1048788 | 11/1966 | United Kingdom . | |
| 1105398 | 3/1968 | United Kingdom . | |

Primary Examiner—Jay H. Woo
Assistant Examiner—Robert B. Davis

[57] ABSTRACT

A method for manufacturing a curved rubber pipe is provided with a guide member (3) arranged concentrically with a mandrel (2, 402). A straight rubber semi-finished product (4) of an unvulcanized or semi-vulcanized rubber is inserted into the guide member (3). A die lubricant can be applied only to the inside of the rubber semi-finished product (4) over its whole length. The rubber semi-finished product (4) is fitted on the mandrel (2, 402) by pushing the product by a head (7) mounted on a leading end of an arm (6). One end of the curved rubber pipe (1) is gripped after vulcanizing by a gripping member (10) and is extracted from the mandrel (2, 402). By this method, it is possible to fit and smoothly extract the rubber semi-finished product (4). The method can also easily be automated.

28 Claims, 27 Drawing Sheets (G)

(H)

METHOD AND DEVICE FOR MANUFACTURING RUBBER BEND PIPE

BACKGROUND OF THE INVENTION

1. Field of the Invention

The present invention relates to a method for manufacturing a curved rubber pipe and a device therefore.

2. Description of the Background Art

In order to manufacture a curved rubber pipe, for example, a pipe bent three-dimensionally, conventional operations included a fitting step for covering a straight pipe-like molding material (hereinafter referred to as a rubber semi-finished product) of an unvulcanized or semivulcanized rubber on a curved mandrel, a vulcanizing step for forming a rubber pipe fixed in a curved shape by heating and vulcanizing the rubber semi-finished product in a condition fitted on the mandrel, and an extracting step for removing the vulcanized rubber pipe from the mandrel.

Also, in the fitting step, die lubricant has been applied to facilitate connecting and disconnecting of the rubber semi-finished product to the mandrel. This step of applying has been done by manually dipping the rubber semi-finished product into a tank containing the die lubricant.

During the fitting step, the rubber semi-finished product which is easily bent is fitted to the mandrel by being manually pushed in a direction of the mandrel. The fitting must be carefully effected by the slow and relatively time consuming step of pushing so that the rubber semi-finished product does not buckle or bend during the fitting. Besides being time consuming, this step is difficult to automate.

Also, the extracting step is effected by the manual operation because it is difficult to automate it. The rubber pipe immediately after vulcanizing is handled at a condition of high temperature in order to lessen an extracting load when the curved rubber pipe is removed from the mandrel. For this reason, the operation is forced to be performed in a very difficult operating environment with high temperature and high humidity. Thus, it is necessary for the operator to take relatively frequent rest periods and also, it is difficult to raise the operating efficiency.

On the one hand, in the aforesaid step applying the die lubricant, it is impossible to avoid the die lubricant being applied on inner and outer surfaces of the semi-finished rubber product. However, the die lubricant is required to be applied only on the inner surface of the rubber semi-finished product. It is unnecessary and uneconomical for the die lubricant to be applied to the outer surface.

It is also necessary to effect a dripping out treatment in which the excess die lubricant is dripped out from the rubber semi-finished product pulled up from the tank after dipping, and excess time is required for this treatment.

Further, the dripping treatment has a tendency to worsen the operating environment depending on conditions in which the tank for die lubricant remains opened and the die lubricant is spilled on floor surface. Costs are incurred to effect a draining treatment together with cleaning.

Then, it is an object of the present invention to provide a method and a device for manufacturing a curved rubber pipe which is capable of improving the operating efficiency of the fitting step, adapting to bulk production, and attaining automation.

SUMMARY OF THE INVENTION

As a means to solve the problems mentioned above, there is provided a method for manufacturing a curved rubber pipe comprising a fitting step for covering a straight pipe-like rubber semi-finished product of an unvulcanized or semi-vulcanized rubber on a curved mandrel, a vulcanizing step for forming a rubber pipe fixed in a curved shape by heating and vulcanizing the rubber semi-finished product in a condition fitted on the mandrel, and an extracting step for removing the vulcanized rubber pipe from the mandrel. The method also comprises steps of arranging a rectilinear guide member on the same axis as that of the mandrel, and pushing out and fitting the rubber semi-finished product from said guide member on said mandrel by pushing an end opposite to the mandrel side of the rubber semi-finished product supported on said guide member.

Further, the manufacturing method is characterized in that die lubricant is applied on inner surfaces of the rubber semi-finished product before or at the same time to the fitting of the rubber semi-finished product.

The manufacturing method is also characterized in that, the die lubricant is applied only to the inner surfaces of the rubber semi-finished product, at the same time by inserting a nozzle into a hollow portion of the rubber semi-finished product being supported on the guide member and allowing the die lubricant to discharge from the nozzle.

Moreover, the manufacturing method is characterized in that, the guide member is tubular and the rubber semi-finished product is supported in a hollow portion of the guide member, whereby the die lubricant is applied while the nozzle is displaced in an axial direction in the hollow portion of the rubber semi-finished product.

The manufacturing method is further characterized in that, the die lubricant is applied to the inside of the rubber semi-finished product, by inserting the guide member into the hollow portion of the rubber semi-finished product, by utilizing the guide member as a nozzle by providing a delivery passage for die lubricant in the guide member and a discharge port communicating with the delivery passage, and by pushing out the rubber semi-finished product.

In the manufacturing method during the extracting step, a periphery of one end of the rubber pipe is gripped by a gripping member at a condition of relatively high temperature immediately after vulcanizing, and the gripping member is pulled along the axial direction of the mandrel, whereby the rubber pipe is extracted from the mandrel.

A device for manufacturing a curved rubber pipe undertakes the steps of covering a straight pipe-like rubber semi-finished product of an unvulcanized or semi-vulcanized rubber on a curved mandrel, and heating and vulcanizing the rubber semi-finished product when it is fitted on the mandrel. The device comprises a curved mandrel, a straight guide member arranged on an axis identical to that of the mandrel, a straight pipe-like rubber semi-finished product supported on the guide member, and pushing means for pushing the rubber semi-finished product from the guide member on the mandrel by pushing one end surface opposite to the mandrel side of the rubber semi-finished product.

The device for manufacturing a curved rubber pipe is further characterized in that the guide member is hollow. The rubber semi-finished product is supported in the hollow portion of the guide member.

The device for manufacturing a curved rubber pipe further has the pushing means being provided with a head portion for pushing the end surface opposite to the mandrel side of the rubber semi-finished product, and a recess in which a free end of the mandrel is capable of fitting on the head portion.

In the device for manufacturing a curved rubber pipe, a head portion is provided to push the end surface opposite to the mandrel side of the rubber semi-finished product toward the pushing means, and an air passage is provided in the head portion to communicate the inner space of the rubber semi-finished product and an outer space of the head portion.

In the device for manufacturing a curved rubber pipe, the rubber semi-finished product is covered when on the guide member.

A device for manufacturing a curved rubber pipe is characterized in that a gripping member is provided to freely advance and retract on an extension of an axis of a curved rubber pipe in order to grip one end portion of the curved rubber pipe fitted on a mandrel. The gripping member is provided with a plurality of pawls which surround the periphery of the curved rubber pipe and are divided in an equi-distance in the peripheral direction. Each pawl is formed with a sawtooth-like tooth portion which is capable of contacting with the curved rubber pipe and which inclines in an extracting direction. A diameter of a face circle formed by joining leading ends of the tooth portion of each pawl is smaller than an outer diameter of the curved rubber pipe. The gripping member is designed to perform a gripping action in which the tooth portion runs on and grips the periphery of the curved rubber pipe when the gripping member is displaced toward one end portion of the curved rubber pipe. The tooth portion bites into the periphery of the curved rubber pipe when gripping the latter.

The device for manufacturing a curved rubber pipe is further characterized in that each pawl is rotatably supported by a supporting shaft extending in a direction intersecting the axis of the mandrel and when the gripping action is effected by allowing the gripping member to be displaced toward the end of the curved rubber pipe, the face circle is expanded as much as the outer diameter of the curved rubber pipe. It is then possible to rotate each tooth portion pawl in an escaping direction so that the tooth portion runs over the periphery of the curved rubber pipe.

The device for manufacturing a curved rubber pipe allows each pawl to rotate in the escaping direction. A force rotating means is provided for forcibly rotating each pawl in the escaping direction before contacting the curved rubber pipe.

Each pawl in the gripping condition is rotated and excited by means of a spring in a biting direction of the tooth portion.

In the device for manufacturing a curved rubber pipe, force opening and closing means are provided for advancing and retracting each pawl in a radial direction of the curved rubber pipe and changing an opening position which has the face circle larger than the outer diameter of the curved rubber pipe and a biting position which has the face circle smaller than the diameter.

In the device for manufacturing a curved rubber pipe, an aligning guide is arranged at the mandrel side of the gripping member. The aligning guide is provided with a guide bore which is concentric with the face circle formed on the leading end of the tooth portion of each pawl and is capable of passing the curved rubber pipe, and a guide surface inclining in the extracting direction toward the guide bore.

A device for manufacturing a curved rubber pipe uses the steps of covering a straight pipe-like rubber semi-finished product of an unvulcanized or semi-vulcanized rubber on a curved mandrel, and heating and vulcanizing the rubber semi-finished product when it is fitted on the mandrel. The device comprises a mandrel base which cantilevers a mandrel and which is displaceable on guide rails constructed on a vulcanizing device. A guide member, a pushing device and an extracting device are arranged along the guide rails at the free end side of the mandrel. The guide member is rectilinear and is arranged on the same axis with the mandrel so as to support the rubber semi-finished product to be guidable along the axial direction of the mandrel. The pushing device is provided at a position in which the guide member is inserted between the guide rails and is capable of pushing out the rubber semi-finished product supported on the guide member in the direction of the mandrel. The extracting device is capable of extracting the rubber pipe from the mandrel by displacing the gripping member gripping a periphery of one end of the vulcanized rubber pipe along the axial direction of the mandrel.

In the device for manufacturing a curved rubber pipe, die lubricant applying means are provided for applying die lubricant on an inner surface of the rubber semi-finished product.

Work stand rails are arranged parallel to the guide rails to insert the guide member therebetween. The work stand rails are adapted to freely displace thereon a first work stand on which the pushing device is provided and a second work stand on which the extracting device is provided. A plurality of mandrel bases are adapted to support mandrels in plural rows and plural steps. One siding rails is connected to the guide rails and another sliding rail intersects the first rail. The sliding rails are provided to guide the mandrel bases to a siding position provided between the guide rails and the work stand rails.

In the device for manufacturing a curved rubber pipe, centering means are provided on a supporting base of the guide member to allow an axial center of the guide member to coincide with an axial center of the mandrel, the guide member being mounted on the supporting base of the guide member through the intermediary of the centering means.

According to the invention, since the rubber semi-finished product can be covered on the periphery of the mandrel by pushing the end surface opposite to the mandrel side of the rubber semi-finished product supported on the guide member, the rubber semi-finished product can be smoothly fitted without buckling and the operating time in the fitting step is significantly shortened whereby it is possible to improve the operating efficiency.

Since the die lubricant can be applied according to need on the inner surfaces of the rubber semi-finished product before or at the same time as the fitting step, it is economical, healthy and efficient because the system can be automated. Furthermore, a better, healthier environment at the production site can be obtained.

Because the die lubricant can be applied only to the inner surfaces of the rubber semi-finished product, by inserting a nozzle into a hollow portion of the rubber semi-finished product and discharging the die lubricant from the nozzle, the applying range can be limited only to the necessary minimum portion and is very economical. Moreover, bulk production and automation are possible.

Also, it is unnecessary to perform the dripping out treatment as in the prior art and it is possible to improve the operating efficiency. A condition in which the die lubricant is spilled on the floor surface when dripping out to contaminate the floor surface is solved, and the tank for die lubricant can be sealed. Moreover, it is possible to lessen the dispersing amount of the die lubricant because it is applied inside the rubber semi-finished product. Therefore, it is possible to attain a better operating environment and to reduce the cost of draining treatment.

Because the nozzle is displaceable in the axial direction in the hollow portion of the rubber semi-finished product by allowing the outside of the latter to be supported by the guide member, the die lubricant can be applied only to the inner surface of the rubber semi-finished product over its entire length.

Since the inside of the rubber semi-finished product is supported by the guide member and the latter is utilized as a nozzle, it is unnecessary to provide a separate nozzle in addition to the guide member. Also, because the latter is a fixed member, the die lubricant applying device is simple in its structure.

Furthermore, since the die lubricant can be applied with fitting the rubber semi-finished product on the mandrel, it is further possible to improve the operating efficiency.

The gripping member is used in the extracting step and the rubber pipe is extracted at a relatively high temperature immediately after vulcanizing. Therefore, the waiting time is lessened and the curved rubber pipe can be extracted immediately after vulcanizing. Therefore, the shaping cycle can be shortened. Furthermore, since it can be automated, the performance of bulk production is improved and the operator can be released from the severe operating environment.

The rubber semi-finished product can be pushed from the guide member without buckling and fitted on the mandrel by pushing one end surface opposite to the mandrel side of the rubber semi-finished product supported on the guide member. Accordingly, the operating time can be shortened significantly in the fitting step, and moreover, since automation is possible by using the pushing device, the operating efficiency is further improved.

Because the guide member is a hollow member and the rubber semi-finished product is supported in the hollow portion on the periphery thereof, the rubber semi-finished product is capable of fitting on the mandrel without buckling.

The recess in which a free end of the mandrel is capable of fitting on the head portion is provided allows an end position of the rubber semi-finished product to be adjusted on the mandrel. Therefore, the shaping can be facilitated if the dispersion exists in the length of the rubber semi-finished product.

Since the head portion is provided with the air passage, the air inside of the rubber semi-finished product can be rapidly displaced from the air passage to the outer space of the head portion when the rubber semi-finished product is pushed out. The air resistance is thereby lessened and it is possible to attain a smoother fitting operation.

The straight pipe-like rubber semi-finished product is supported in the periphery of the guide member. Therefore, the rubber semi-finished product can be fitted on the mandrel without buckling while supporting the inner periphery thereof. Moreover, because the air inside the rubber semi-finished product displaces to the outer space of the head portion through the air passage of the head portion, the structure can be simplified at the side of the pushing device.

The gripping member is provided with a plurality of pawls which are equi-distance in the peripheral direction of the curved rubber pipe, whereby a periphery of the end of the curved rubber pipe can be gripped with a uniform force. Therefore, the pipe can be extracted without being flattened.

Also, the pawl is formed with sawtooth-like tooth portion inclining in the extracting direction, and the face circle is smaller than an outer diameter of the curved rubber pipe. When the end of the curved rubber pipe is gripped, it is therefore possible to perform a gripping action which runs on the periphery of the curved rubber pipe, and moreover, when extracting the curved rubber pipe, the pipe can be exactly removed by the biting action.

Furthermore, since the extracting operation can be effected by machines without using hands, the operator is released from the severe operating environment. Also, the relatively frequent rest times are unnecessary. It is therefore possible to shorten the shaping cycle and to improve the operating efficiency, as well as to attain bulk production and automation.

Since the pawl is rotatable by the supporting shaft extending in a direction intersecting the axis of the curved rubber pipe, when the end portion of the curved rubber pipe is gripped, the pawl rotates in the escaping direction and can run easily on the end portion of the curved rubber pipe. A smooth gripping action can be attained.

A rotating means is provided. When the pawl runs on the periphery of the curved rubber pipe during the gripping action, the tooth portion will not frictionally contact the periphery of the curved rubber pipe by rotating previously in the escaping direction, whereby the pawl runs smoothly on the periphery of the curved rubber pipe without resistance and damage due to the pawl on the outer surface of the curved rubber pipe becomes smaller.

By using a spring to urge the pawl in a biting direction, the biting action can utilize the energizing force of the spring.

Because opening and closing means are provided, the pawl can be displaced forcibly in the escaping direction or in the biting direction. It is thereby possible to more exactly perform each of the gripping, extracting, and opening operations at high speed and it is possible to minimize the damage on the outer surface of the curved rubber pipe due to the pawl.

When the gripping member is displaced in the direction of the curved rubber pipe, since the guide surface of the aligning guide first contacts the leading end of the curved rubber pipe and the leading end is guided by the guide surface while the guide bore coincides with the leading end of the curved rubber pipe, it is possible to allow the gripping member to run smoothly on the periphery of the curved rubber pipe during the gripping action. Also, since it is possible to align the gripping member with the mandrel even if they are not exactly on the same axis, the centering operation of the gripping member can be facilitated.

The curved rubber pipe is shaped successively so that automation is possible. The shaping efficiency is therefore high and it is possible to obtain a labor-saving device.

Because the application of the die lubricant can be performed continuously at the necessary amount and can be automated, it is possible to obtain improved operating performance and also a healthier environment.

Since the first and second work stands are freely displaced on the work stand rails, the separate step can be performed at the same time to the plurality of mandrel bases on the guide rails. Thus, it is possible to continuously shape a lot of curved rubber pipes at the same time. Further, since it can be automated, it is possible to obtain a device which is suitable for bulk production.

Because the centering means are provided on the supporting base of the guide member to allow an axial center of the guide member to coincide with an axial center of the mandrel and the guide member is mounted on the supporting base of the guide member through the intermediary of the centering means, the guide member can be precisely centered on the same axis as the axis of the mandrel by the centering means, whereby the centering and mounting operations of the guide member become rapid and exact.

One end of the mandrel is cantilevered on the mandrel base and the positioning means are provided to arrange the other end of the mandrel concentrically with the guide member. When the one end of the mandrel is mounted on the mandrel base, the other end can be precisely centered on the same axis as the axis of the mandrel member. The centering and mounting operations of the mandrel will therefore become rapid and exact and the operating performance will significantly be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

FIGS. 1(A)–1(E) are views showing principles of each step of a fitting step, a vulcanizing step and an extracting step in a method of manufacturing a curved rubber pipe according to one embodiment of the present invention in principle and time-series manner.

Figure 1:
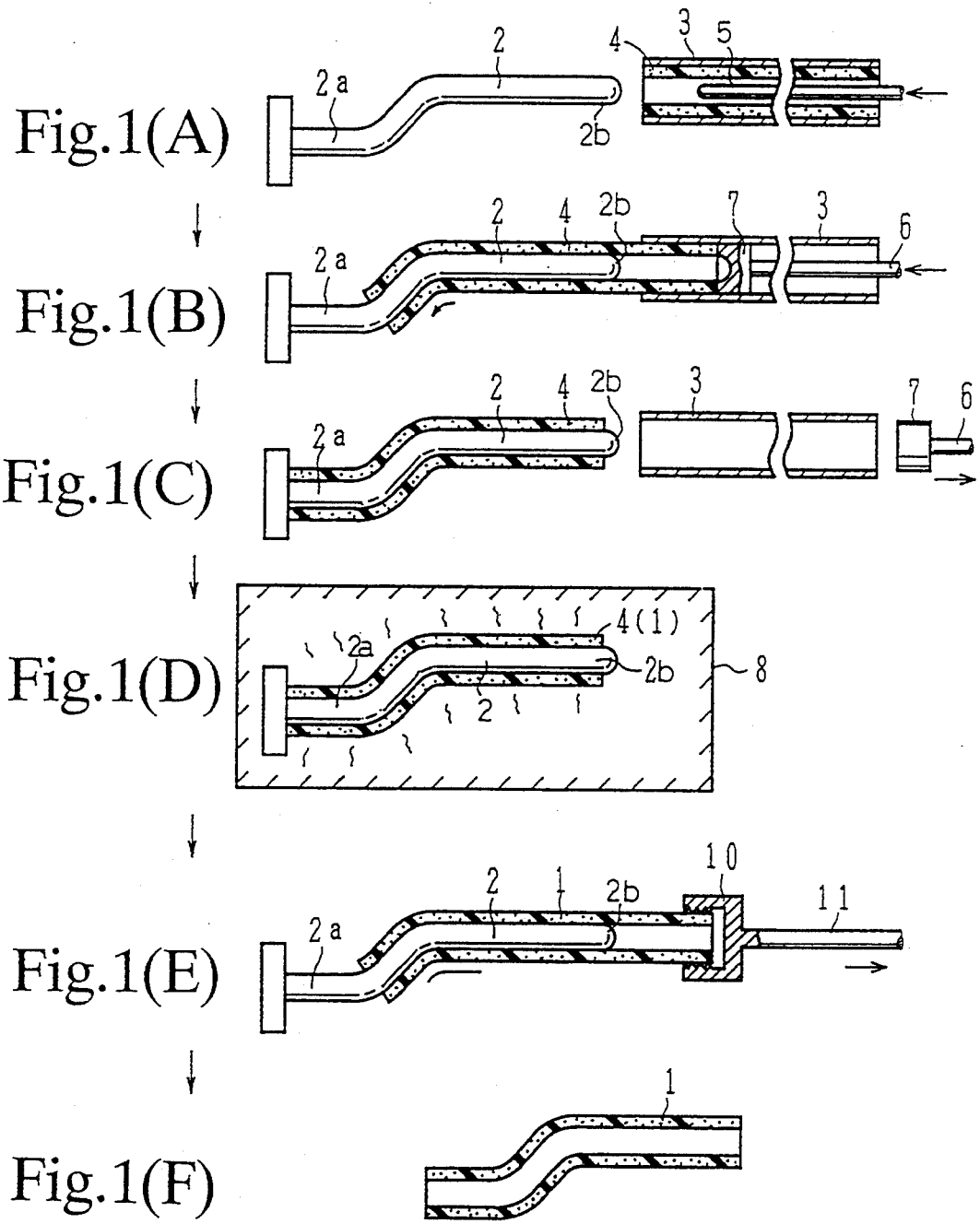
FIGS. 1(A) through 1(F) are flow views showing one embodiment of the present invention.

In each FIGS. 1(A), 1(B) and 1(C), a fitting step is shown. In FIG. 1(D) a vulcanizing step and in FIGS. 1(E) and 1(F) an extracting step are shown. Further, an outline shown in FIG. 1(F) is a cross sectional form of a curved rubber pipe 1, a finished article. This curved rubber pipe is three-dimensionally bent.

First of all, in the fitting step of FIG. 1(A), a mandrel 2, a guide member 3 and a rubber semi-finished product 4 are arranged on the same axis. The mandrel 2 is cantilevered on a mandrel base (see reference numeral 430 in FIGS. 32 and 33), and is a member bent in the same shape as the curved rubber pipe 1 as shown in FIG. (F). The mandrel 2 is provided with a base portion 2a and a free end 2b, and the straight pipe-like guide member 3 is arranged adjacent to an axis of the mandrel and the free end 2b on the same axis.

Into a hollow portion of the guide member 3, a rubber semi-finished product 4 having a straight pipe shape is inserted. The product 4 is supported to freely displace in a direction of length of the guide member 3.

The rubber semi-finished product 4 can be EPT, NBR, NBR and PVC copolymer, SBR, CR, NR and any other suitable rubber materials or blends of those suitably combined, or blends of a suitable material among them and a material other than, if necessary, a material including short fibers kneaded into rubber, a material including reinforced yarn or woven textile, a material having a surface knitted with reinforced yarn, or the like.

Further, in FIG. 1(A) a nozzle 5 is inserted inside the rubber semi-finished product 4 before fitting the latter. The nozzle 5 is adapted to advance and retract in an axial direction of the rubber semi-finished product with discharging die lubricant therefrom, whereby the die lubricant is applied to an inner surface of the rubber semi-finished product 4.

In FIG. 1(B), an arm 6 constituting part of a pushing device described hereinafter is pushed into the guide member 3 from a side opposite to the mandrel 2, and a head 7 which has a size generally equal to an inner diameter of-the guide member 3 mounted on a leading end of the arm 6 is abutted to one end of the rubber semi-finished product 4, whereby the latter is pushed out to aside of the mandrel 2.

Then, the rubber semi-finished product 4, in spite of possible buckling and easy bending, is covered and pushed on a periphery of the mandrel 2 without buckling and bending in front of the mandrel 2 because the rubber semi-finished product 4 is guided at the periphery thereof by the guide member 3 together with the mandrel 2 on the same axis, and is pushed out at a side of the base portion 2 along a bent form of the mandrel 2.

The FIG. 1(C) is a condition in which the fitting of the rubber semi-finished product 4 has been completed, and the rubber semi-finished product 4 is fitted on the periphery of the mandrel and is curved in the same shape as the mandrel is shown in FIG. 1(C). Simultaneously, the arm 6 and head 7 are retracted from the inner side of the guide member 3.

FIG. 1(D) shows the vulcanizing step, and the rubber semi-finished product 4 is moved into a vulcanizing device 8 while on the mandrel 2, and is vulcanized by heating at a required temperature, pressure and time thereby to form the curved rubber pipe 1 fixed in its shape which is the same shape as the mandrel 2.

In FIG. 1(E), one end of the curved rubber pipe 1 taken out from the vulcanizing device 8 after vulcanizing is gripped by means of a gripping member 10, and thereafter, an arm 11 of a plunger (see reference numeral 13 in FIG. 2) mounting the gripping member 10 on a lading end thereof is retracted along the axis of the mandrel 2, whereby the curved rubber pipe 1 is extracted from the mandrel 2.

In this time, the curved rubber pipe 1 is extracted in the axial direction of the mandrel 2 with deforming according to curves of the mandrel 2. However, because the curved rubber pipe is at a relatively high temperature immediately after vulcanizing, extraction load becomes smaller, and a smooth operation can be attained.

The curved rubber pipe 1 in FIG. 1(F) is thus extracted and removed from the mandrel 2. The curved rubber pipe 1 is restored to the required bending shape corresponding to the mandrel 2.

Figure 2:
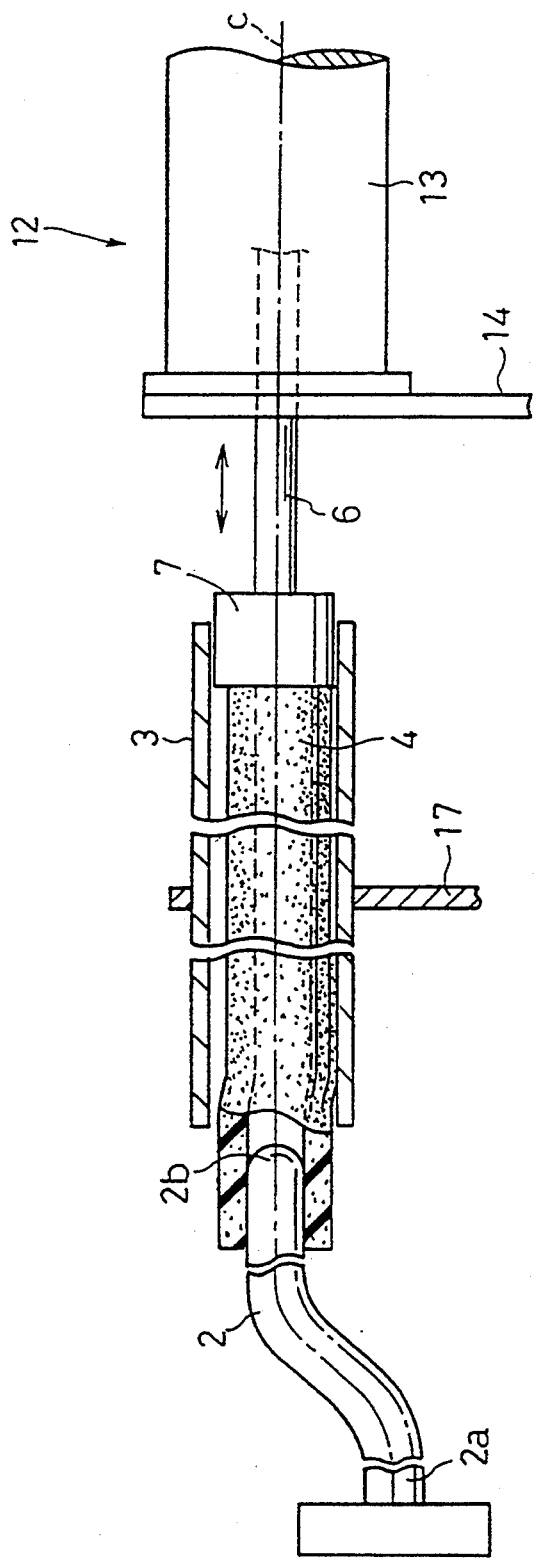
FIG. 2 is a side cross sectional view showing a first embodiment during the fitting step.

FIGS. 2 to 6 are intended to explain a first embodiment of a device for fitting used in the fitting step. As shown in FIG. 2, the manufacturing device is constituted by the mandrel 2, the guide member 3 and a pushing device 12.

The pushing device 12 is constituted by the aforesaid arm 6, the head 7 and a plunger 13 which is arranged in the same axis as the guide member 3 together with the arm 6 and which is supported on a work stand 14.

The arm 6 is extensible by the plunger 13, and at the most extended position, the head 7 abuts a free end 2b of the mandrel 2, whereby the rubber semi-finished product 4 can be fully extracted on the mandrel 2.

Figure 3:
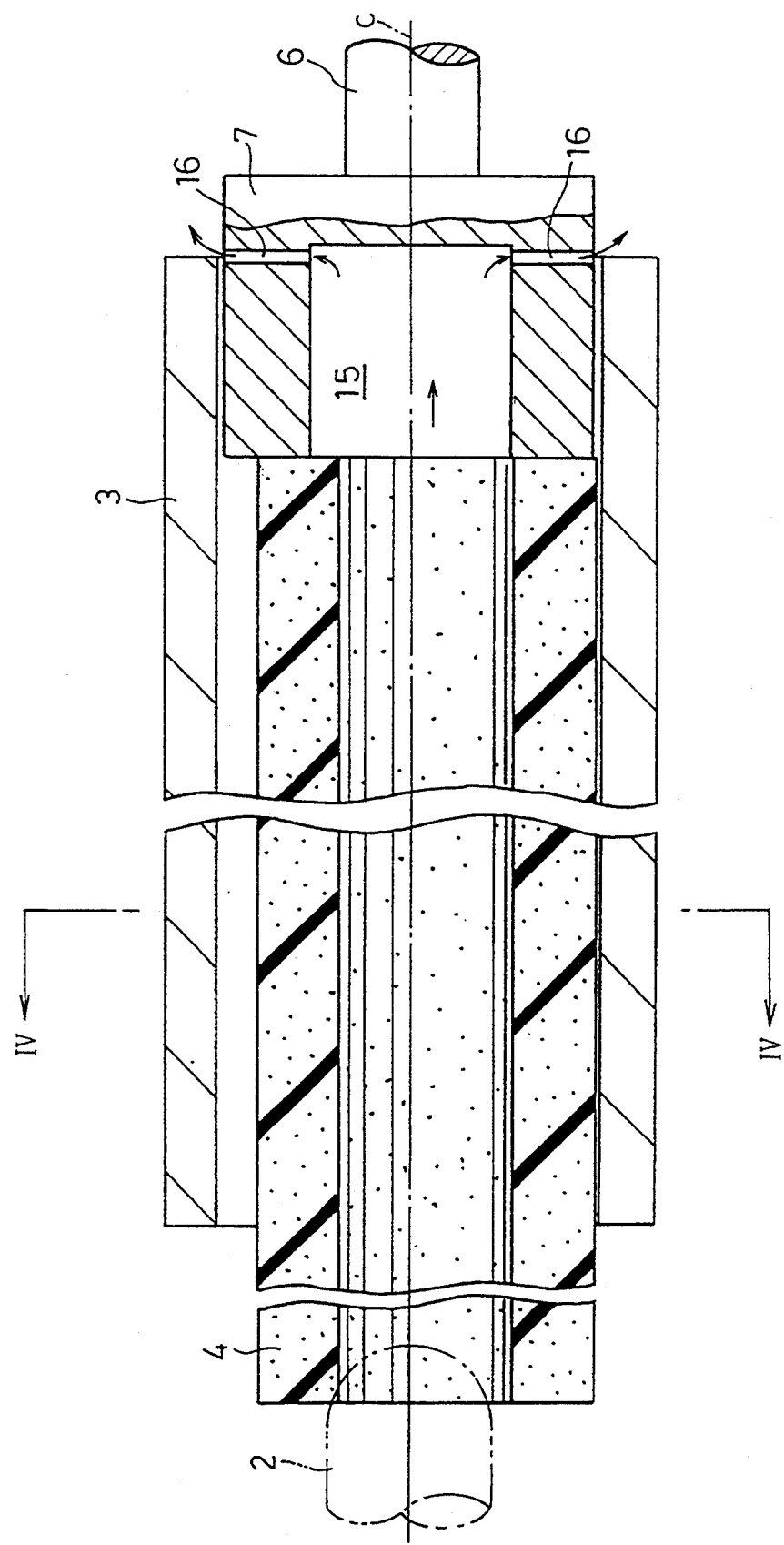
FIG. 3 is a side cross sectional view showing essential parts in the device of the first embodiment in enlarged scale.
Figure 5:
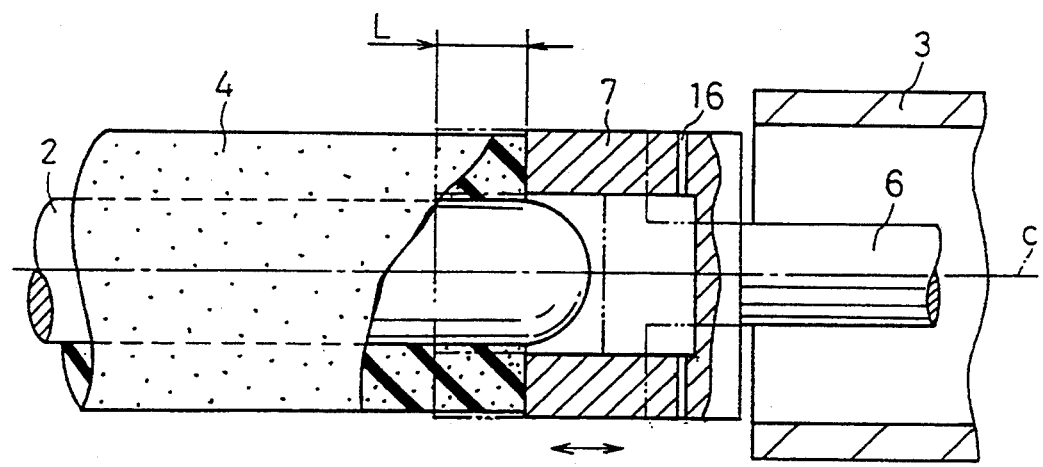
FIG. 5 is a view explaining actuation of the essential parts in the device of the first embodiment.

Further, as apparent from FIG. 3, a recess 15 is formed in the leading end of the head 7, and as shown in FIG. 5, the free end 2b of the mandrel 2 is capable of fitting up to a certain depth of the recess 15. Also, an air passage 16 is formed in a radial direction of the head 7. The recess 15 communicates with an atmosphere side of an outer periphery of the head 7 through this air passage 16.

Figure 4:
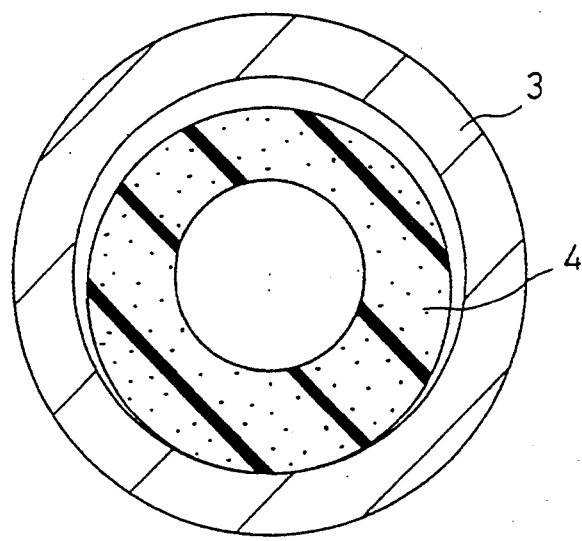
FIG. 4 is a cross sectional view taken along line IV—IV of FIG. 3.

As apparent from FIGS. 3 and 4, the rubber semi-finished product 4 is supported in the hollow portion of the guide member 3 with a certain distance to easily move in its axial direction. Further, reference numeral 17 in FIG. 2 shows a supporting member of the guide member 3.

The following description is made about the method using the device of the first embodiment. In FIG. 2, first of all, the mandrel 2 and the guide member 3 are arranged on the same axis. Into the hollow portion of the guide member 3, the rubber semi-finished product 4 is inserted. An inner surface of the guide member 3 has die lubricant applied thereto.

Thereafter, when the arm 6 is expanded by the plunger 13 of the pushing device 12, the head 7 enters into the hollow portion of the guide member 3 (FIG. 5), and pushes an end surface opposite to the mandrel side of the rubber semi-finished product 4.

For this reason, as shown in FIG. 5, the rubber semi-finished product 4 is displaced within the hollow portion of the guide member 3 in the direction of the mandrel 2. When the head 7 appears to the mandrel 2 side after passing the guide member 3, the whole rubber semi-finished product 4 is fitted onto the periphery of the mandrel 2.

In this time, since the guide member 3 supports the outer periphery of the rubber semi-finished product 4, the latter is not buckled when pushed out on the mandrel 2, and smooth fitting is obtained.

Further, since air compressed inside the rubber semi-finished product 4 when fitting is pushed out from the head 7 to the hollow portion of the guide member 3 through the intermediary of the air passage of the head 7, it is possible to lessen resistance when fitting due to the air inside the rubber semi-finished product.

Therefore, operating time can be significantly shortened during the fitting step. Furthermore, since it is automated by using the pushing device 12, operating efficiency is further improved.

Moreover, as apparent from FIG. 5, since the free end of the mandrel 2 can fit up to a certain depth into the recess 15 of the head 7, if an expanding amount of the arm 6 is adjusted, a position of the end surface of the rubber semi-finished product 4 on the mandrel 2 can be adjusted in an arbitrary range L. This is advantageous when the rubber semi-finished product 4 has dispersion in its length.

Figure 6:
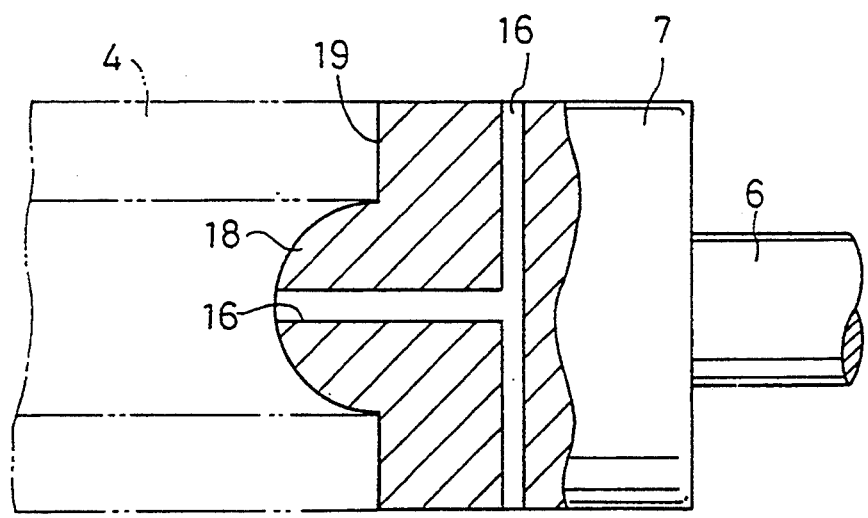
FIG. 6 is a view showing a variation of a head portion shown in FIG. 3.

Further, the head 7 can omit the recess 15. Alternatively, as shown in FIG. 6, the head 7 can have a leading shaft portion 18 projecting toward the mandrel 2, a shoulder portion 19 abutting an end surface of the rubber semi-finished product 4 provided on its outer periphery, and the air passage 16.

Figure 7:
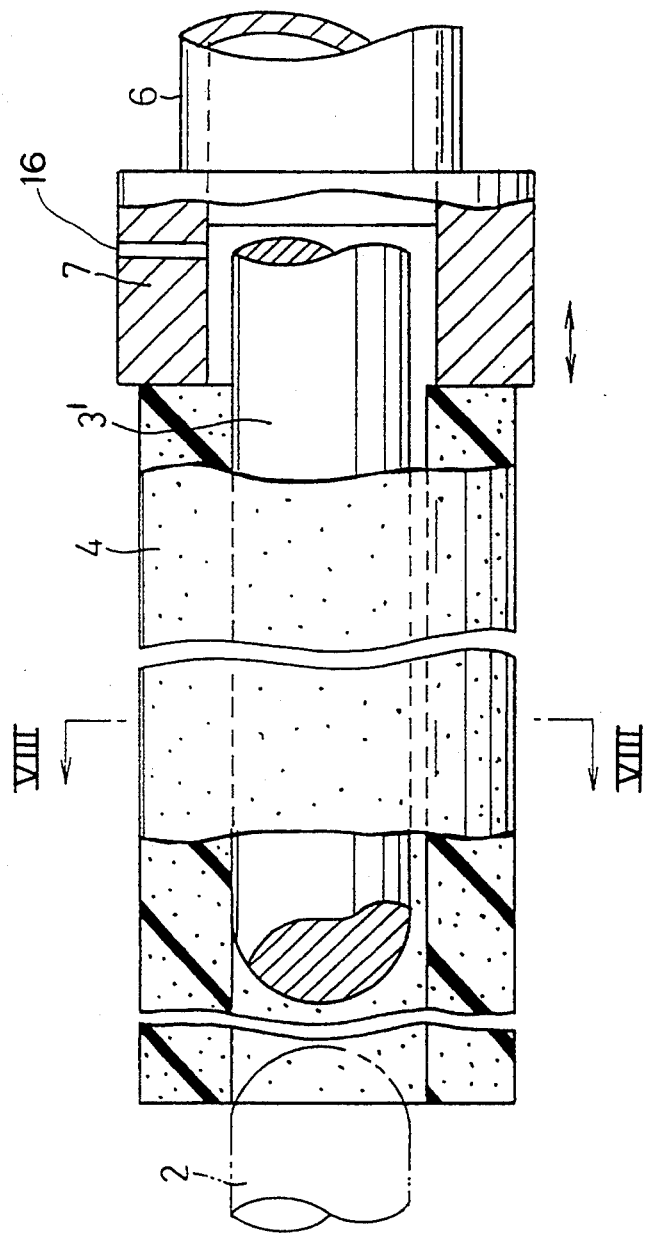
FIG. 7 is a side cross sectional view showing essential parts of a second embodiment during the fitting step.
Figure 8:
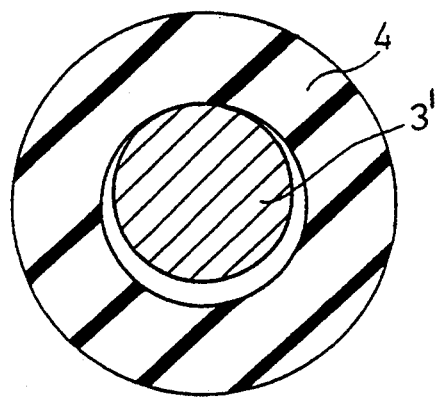
FIG. 8 is a cross sectional view taken along line VIII—VIII in FIG. 7.

FIGS. 7 and 8 are used to explain a second embodiment of the device for the fitting step. Common reference numerals for parts having functions common to those of the embodiment shown in FIGS. 2 to 6 are used.

In the second embodiment, the guide member 3' has a solid shaft shape and is somewhat thinner than an inner diameter of the rubber semi-finished product 4. Accordingly, the product 4 is supported on the periphery of the guide member 3'. The head 7 is capable of sliding on the periphery of the guide member 3'.

Also when thus constructed, since the rubber semi-finished product 4 is supported at its inside by the guide member 3', the smooth fitting can be obtained without buckling. Further, the head 7 can omit the recess 15 and the air passage 16 as in the first embodiment.

Figure 9:
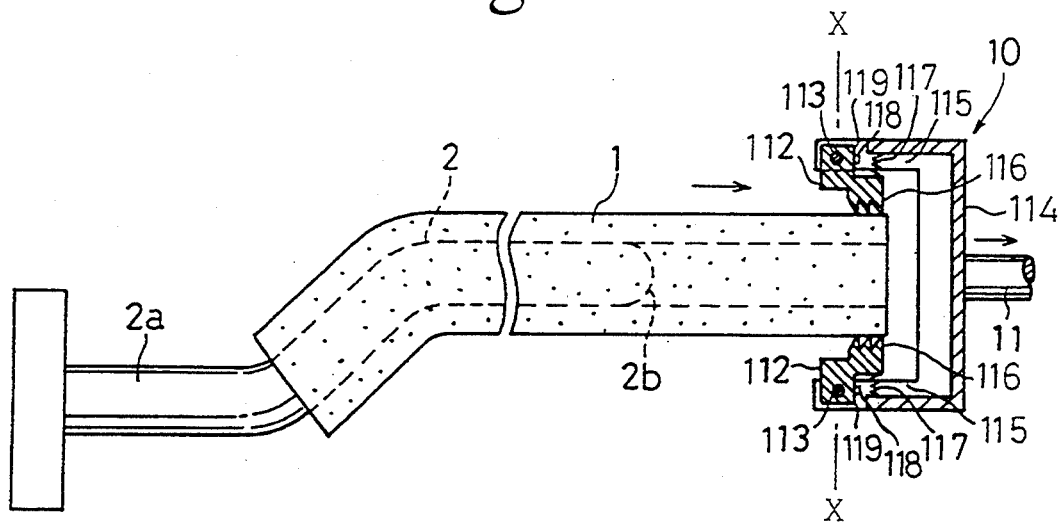
FIG. 9 is a cross sectional view showing a third embodiment during the extracting step.
Figure 10:
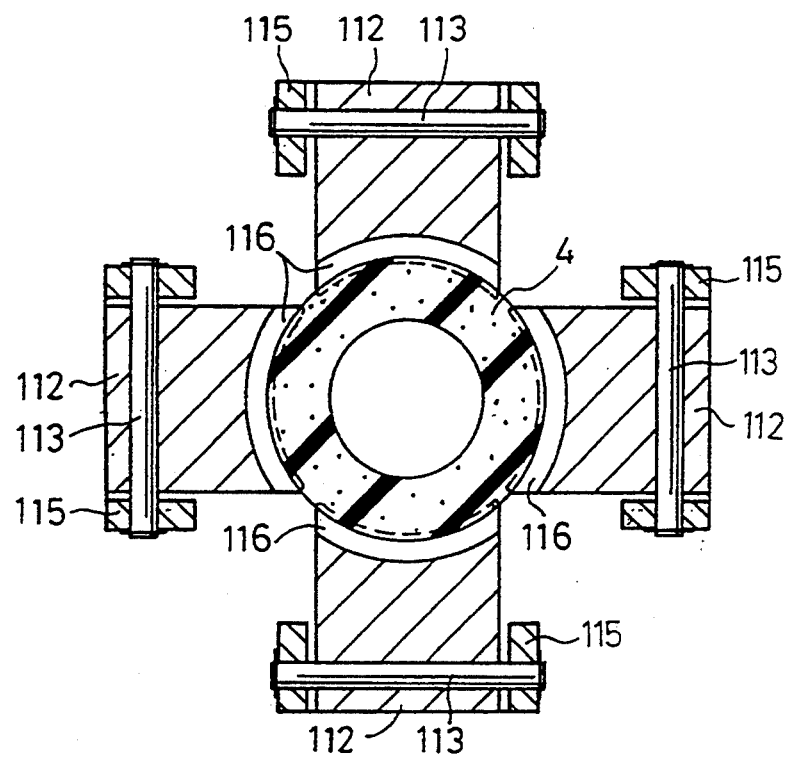
FIG. 10 is an enlarged cross sectional view taken along line X—X in FIG. 9.

FIG. 9 is an enlarged view showing more detail of a device for the extracting step being a third embodiment. This FIG. 9 corresponds to FIG. 1(E). FIG. 10 is a cross sectional view taken along line X—X in FIG. 9.

On the gripping member 10, a plurality of pawls 112 are rotatably mounted by a supporting pin 113. The pawls 112 extend in a direction intersecting the axis of the mandrel 2. The supporting pin 113 is mounted on a leading end of an arm 115 which is bent from a bracket 114 provided on a leading end of the arm 11. The arms 115 face in the direction of the mandrel 2.

On each pawl, saw tooth-like tooth portions 116 are formed. These portions 116 are rotated and energized in a direction for biting the outer periphery of the curved rubber pipe 1 by means of a compression spring 117 tensed between the pawl 112 and the arm portion 115. Further, stoppers 118 which limit the amount of rotation of the pawls 112 are provided on the arms 115 in a position abutting to the shoulder portions of the pawls 112.

As apparent from FIG. 10, the pawls 112 are substantially equidistantly provided at positions dividing the periphery of the curved rubber pipe 1 into four. A face circle formed by joining leading ends of each tooth portion 116 is adapted to become smaller than the outer periphery of the curved rubber pipe 1 (see FIG. 11).

Accordingly, the tooth portion 116 of the pawl 112 can grip the periphery of the curved rubber pipe 1 with substantially unified force. Further, other than four pawls 112 can be used. For example, the pawls can be divided into 3 or more.

Figure 11:
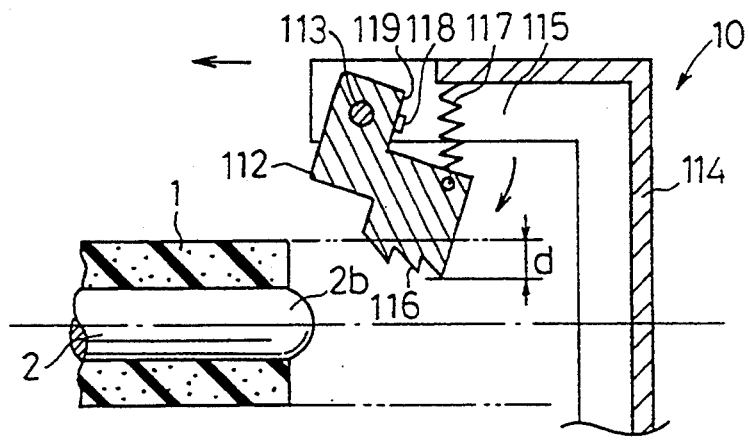
FIG. 11 is a view showing actuation in essential parts of the extracting step of the third embodiment (a condition immediately before gripping)
Figure 12:
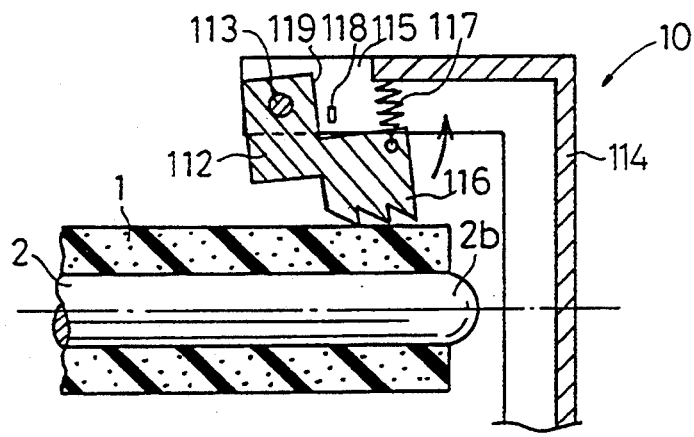
FIG. 12 is a view showing actuation in essential parts of the extracting step of the third embodiment (a condition rotated in an escaping direction)
Figure 13:
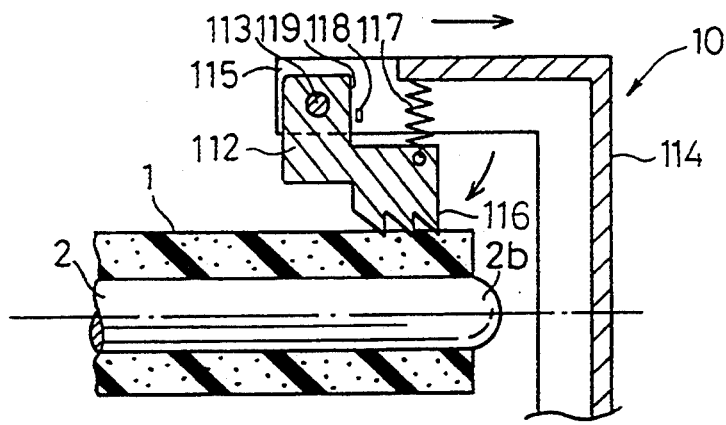
FIG. 13 is a view showing actuation in essential parts of the extracting step of the third embodiment (a condition rotated in a biting direction)

The following description is made about the operation of a third embodiment on the basis of FIGS. 11 to 13. Further, FIGS. 11 to 13 are enlarged views showing different operating conditions of the portion of gripping member 10, respectively.

FIG. 11 shows a condition before gripping the curved rubber pipe 1 after starting the extracting step. The pawl 112 is energized by means of a spring 117 to rotate in a clockwise direction around the supporting pin 113. The shoulder 119 abuts the stopper 118 and the tooth portion 116 stops at a position at which it bites a dimension "d" in an extension of the outer periphery of the curved rubber pipe 1.

In this condition, when the gripping member 10 is displaced in the direction of the free end 2b of the mandrel 2, the gripping action is performed. In the gripping action, the tooth portion 116 initially contacts the leading end of the curved rubber pipe 1.

Then, as shown in FIG. 12, the pawl 112 is pushed by the curved rubber pipe 1 and causes the spring 117 to be compressed. The pawl rotates to escape in a counterclockwise direction of FIG. 12.

By rotating in the escape direction, the pawl 112 runs on the outer periphery of the curved rubber pipe 1 with the tooth portion 116 frictionally contacting the pipe. In this time, since the latter is inclined in the extracting direction, the rotation of the pawl 112 in the escaping direction is more exact.

When the gripping member 10 stops the displacement thereof, the pawl 112 rotates in a reverse direction to the escaping direction, that is, to a biting direction which is the clockwise direction in FIG. 13 under the restoring resiliency of the spring 117. The tooth portions 116 thereby is in a biting condition in the outer periphery of the curved rubber pipe 1 and a substantially uniform force grips the periphery.

Then, as shown in FIG. 13, when the gripping member 10 is displaced in the extracting direction, the tooth portions 116 are biting into the periphery of the curved rubber pipe 1. The tooth portions 116 move in the extracting direction integrally with the gripping member 10, and the pipe 1 is extracted from the mandrel 2.

The end of the curved rubber pipe 1 is then gripped at the periphery thereof with the unified force and it is possible to extract the pipe 1 without being deformed or crushed flat. Further, since the tooth portion 116 has a saw tooth shape inclining in the extracting direction and during extracting, the biting action is performed to increase the biting to the periphery of the curved rubber pipe 1, it is possible to extract the pipe positively.

Though the extracting step is performed at the high temperature condition immediately after vulcanizing the curved rubber pipe 1 in order to lessen the extracting load, the operation can be performed with a machine. It is unnecessary that the operator works under the severe condition of high temperature and high humidity.

Figure 14:
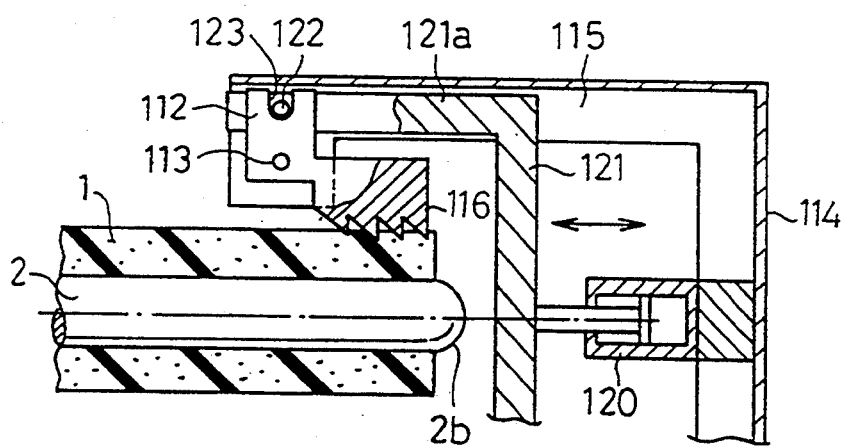
FIG. 14 is a cross sectional view showing essential parts of an extracting step of a fourth embodiment.

FIG. 14 is an enlarged view showing the portion of the gripping member 10 according to a fourth embodiment relating to the device for the extracting step. This fourth embodiment is designed to be capable of forcibly rotating the pawl 112 in either the biting direction or the escaping direction. On a bracket 114, a slider 121 is provided which can advance and retract on an extension of the axis of the mandrel 2 through the intermediary of a plunger 120.

The slider 121 is one embodiment of the forcibly rotating means according to the present invention, and has an arm portion 121a, a periphery of which extends in a direction overlapping with the mandrel 2. A pin 122 provided on a leading end of the arm portion 121a engages an engaging portion 123 which is provided on the pawl 112 and which is cut away in a U shape.

Then, when the plunger 120 is expanded and the slider 121 is moved in the direction of the free end 2b, the pawl 112 pushed against the pin 122 rotates in the escaping direction (counterclockwise direction) about the supporting pin 113. If the slider 121 is moved in a reverse direction, the pawl 112 rotates in the biting direction (clockwise direction in FIG. 14).

Since the pawl 112 is capable of rotating in the escaping direction before it contacts with the curved rubber pipe 1, the contact of the pawl 112 with the periphery of the curved rubber pipe 1 can therefore be smooth without resistance upon the gripping action. It is also possible to lessen the damage to the outer surface of the curved rubber pipe 1 due to pawl 112. Furthermore, since it is capable of rotating in the biting direction without depending on the spring, the biting action can be made positively and it is possible to adjust the biting degree. It is also possible to facilitate an Operation removing the curved rubber pipe 1 from the pawl 112.

Figure 15:
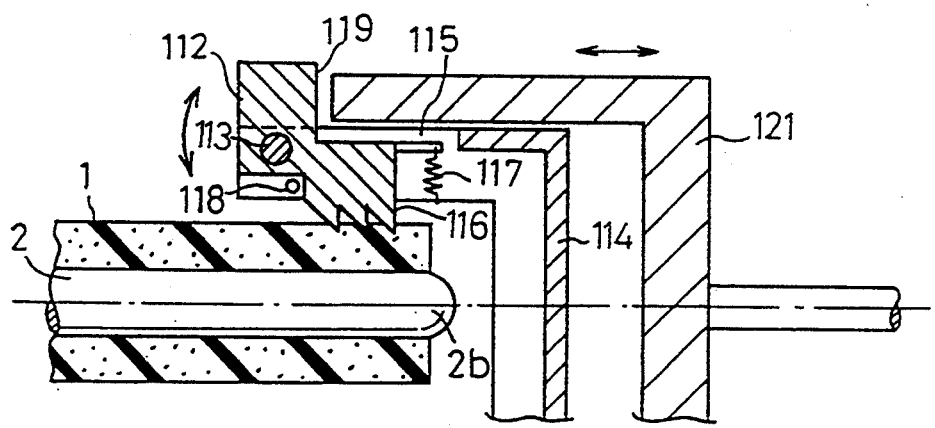
FIG. 15 is a cross sectional view showing essential parts of an extracting step of a fifth embodiment.

FIG. 15 is an enlarged view showing the gripping member 10 according to a fifth embodiment relating to the device for the extracting step. In the fifth embodiment, the pawl 112 is designed to forcibly rotate only in the escaping direction. That is, the slider being the other example of the forcibly rotating means is provided outside of the bracket 114, a leading end of the slider 121 is designed to abut the shoulder 119 of the pawl 112 constituted similarly to the third embodiment.

When the slider 121 is moved to advance in the left in FIG. 15, the leading end of the slider 121 abuts the shoulder 119 and the pawl 112 is rotated in the counterclockwise direction, that is, in the escaping direction Conversely, when the slider 121 is moved to retract toward the right in FIG. 15, the pawl 112 is rotated by means of the spring 117 in the clockwise direction, that is, in the biting direction, whereby the tooth portion 116 is designed to bit into the periphery of the curved rubber pipe 1.

Further, in the fifth embodiment, the spring 117 is constituted as a tension spring, and rotation in a direction closing the pawl 112 is intended to stop at a required position by means of the stopper 118.

Thus, the pawl 112 may be rotated forcibly only in the escaping direction, and the rotation in the biting direction can be performed rapidly by means of the spring 117. Because of this rotation, the particular movement of the slider 121 is not necessary, and therefore, the pawl 112 becomes simple in its rotating operation.

Figure 16:
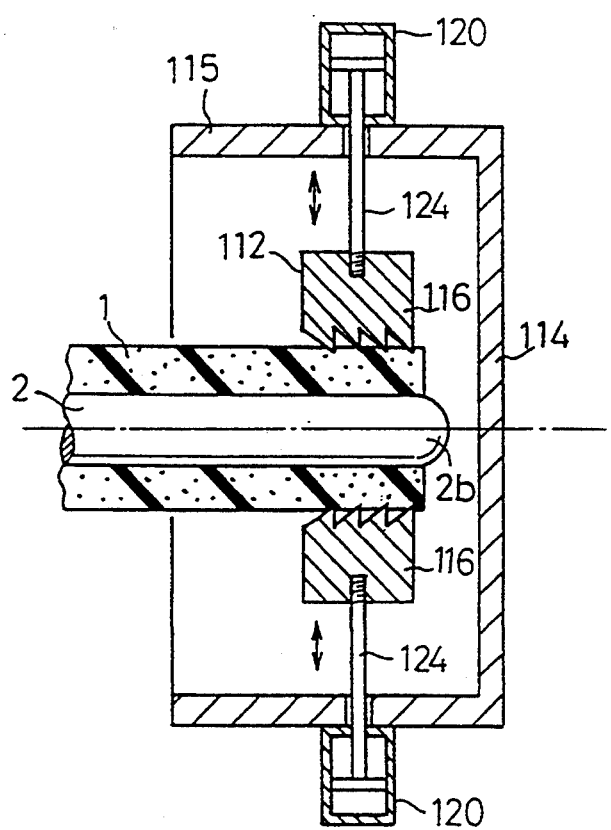
FIG. 16 is a cross sectional view showing essential parts of an extracting step of a sixth embodiment.

FIG. 16 is an enlarged view showing the gripping member 10 of a sixth embodiment relating to the device for the extracting step. In this embodiment, the movement of the pawl 112 is intended to be performed linearly in a radial direction of the curved rubber pipe 1 by forcibly opening and closing means constituted by means of the plunger 120.

That is, on the arm portion 115 of the bracket 114, the plunger 120 is provided. The plunger 120 has an extensible rod 124 which is allowed in its axial direction to coincide with the radial direction of the curved rubber pipe 1. The leading end of the extensible rod 124 is connected to the pawl 112.

Such a plunger 120 is provided for each pawl 112 in the periphery direction of the curved rubber pipe 1, and when the extensible rod 124 is extended by the plunger 120, each pawl 112 moves in synchronism to the biting position inside the radial direction of the curved rubber pipe 1. The tooth portions 116 then bite into the periphery of the curved rubber pipe 1 by the fact that the face circle is closed to become smaller than the outer diameter of the curved rubber pipe 1.

Conversely, when the plunger 120 contracts the extensible rod 124, each of the pawls 112 moves in synchronism outside the radial direction, whereby the face circle of the tooth portion 116 moves into an opening position larger than the outer diameter of the curved rubber pipe 1. The pawls 112 are opened so that the tooth portions 116 are separated from the curved rubber pipe 1.

Therefore, because the pawl 112 does not rotate upon the gripping and biting actions as in the third to fifth embodiments relating to the device for the extracting step mentioned above, it is possible to minimize the damage to the outer surface of the curved rubber pipe 1 due to the tooth portion 116. The rapid and positive opening action is effected when the curved rubber pipe 1 is gripped and is removed from the pawl 112.

Figure 17:
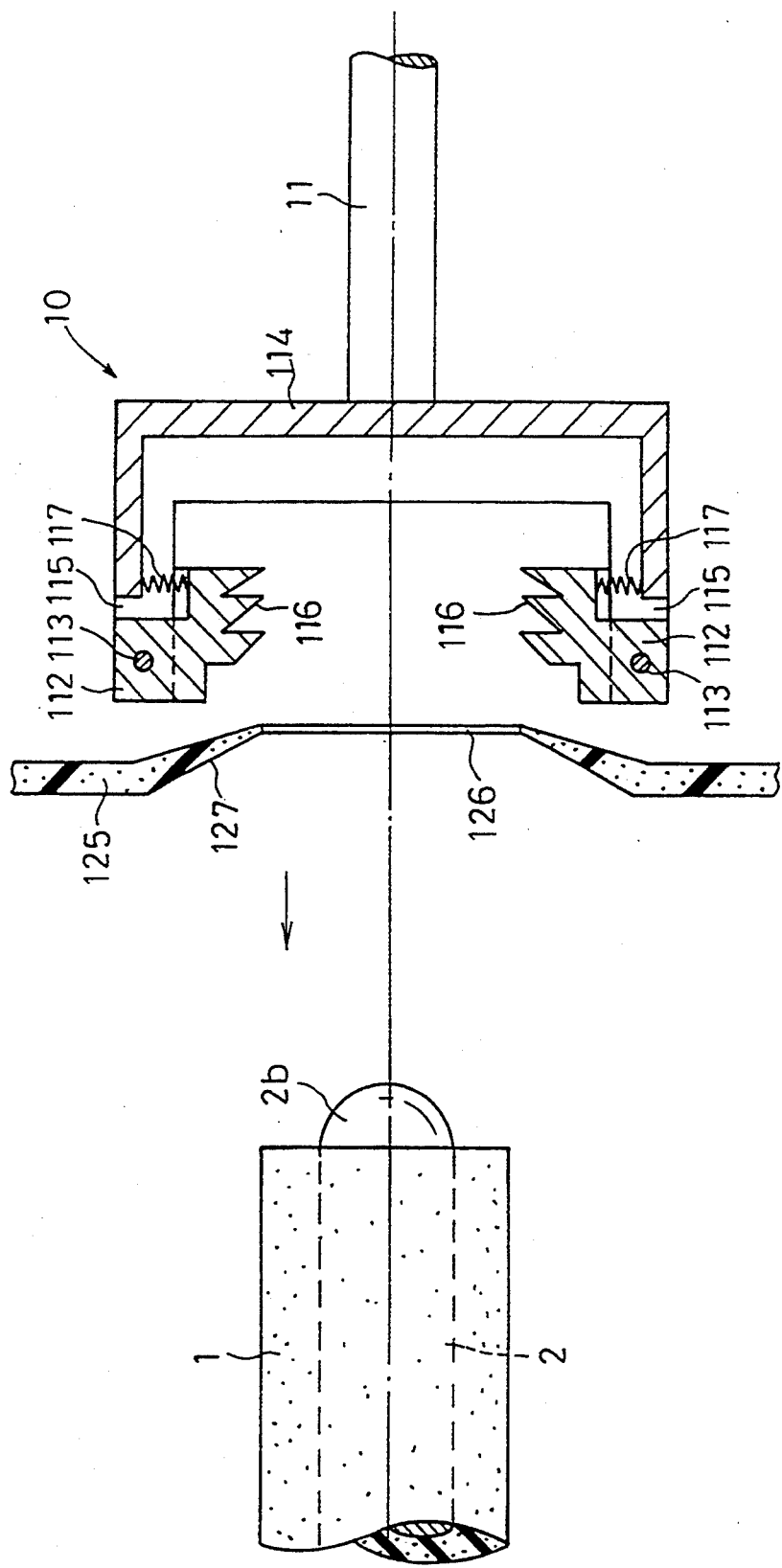
FIG. 17 is a cross sectional view showing essential parts of an extracting step of a seventh embodiment.

FIG. 17 is an enlarged view showing the gripping member 10 according to a seventh embodiment relating to the extracting step. In this seventh embodiment, the gripping member 10 is identical to the third embodiment, and an aligning guide 125 is provided between the free end 2b of the mandrel 2 and the gripping member 10.

The aligning guide 125 is a disc-like member concentric with the mandrel 2 and gripping member 2. A guide opening 126 opened at a center portion of the guide 125 has an inner diameter substantially identical to the outer diameter of the curved rubber pipe 1. The aligning guide 125 is united with the gripping member 10 by mounting on the side of the bracket 114 so as to become concentric with the face circle of the tooth portion 116 of the pawl 112. Also, on the aligning guide 125, a guide slant surface 127 is formed which is directed in a center direction at a periphery of the guide opening 126 and which inclines in the extracting direction.

Then, in order to grip the curved rubber pipe 1, when the gripping member 10 is moved to the free end 2b side, the guide slant surface 127 of the aligning guide 125 contacts with the leading end (free end 2b side) of the curved rubber pipe 1, and moves the leading end of the curved rubber pipe 1 in a direction to intersect the axis so as to allow the leading end of the pipe 1 to coincide with the guide opening 126. Accordingly, the aligning guide 125 is aligned to the gripping member.

Therefore, even is disorder exists somewhat between the axes of the mandrel 2 and the gripping member 10, since, under the aligning action of the aligning guide 125, the pawl 112 of the gripping member 10 runs smoothly on the curved rubber pipe 1 and is possible to grip it. It is also possible to reduce centering precision when concentrically arranging the mandrel 2 and the gripping member 10. The centering operation therefore becomes easy.

Further, the device for extracting is not limited to the aforesaid third embodiments to the seventh embodiment and is capable of deforming to various aspects. For example, it is not necessary to rotate or move the pawl 112 which may be integrally fixed with the gripping member 10. In this case, if the tooth portion 116 is a saw tooth-like portion as mentioned above, the pawl 112 can perform the gripping action and the biting action.

Figure 18:
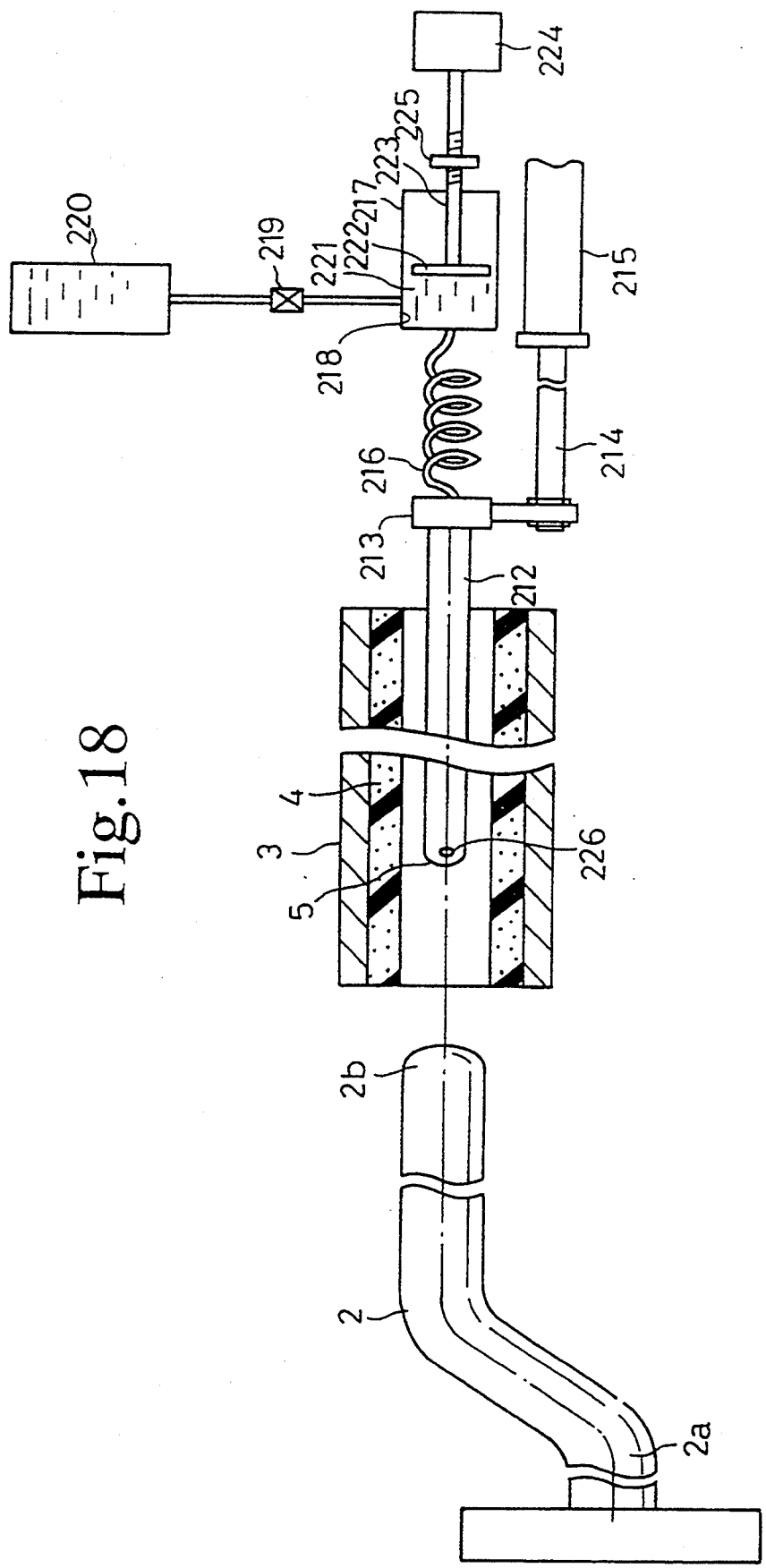
FIG. 18 is a schematic view showing a die lubricant applying device using a method of applying die lubricant of an eighth embodiment.
Figure 19:
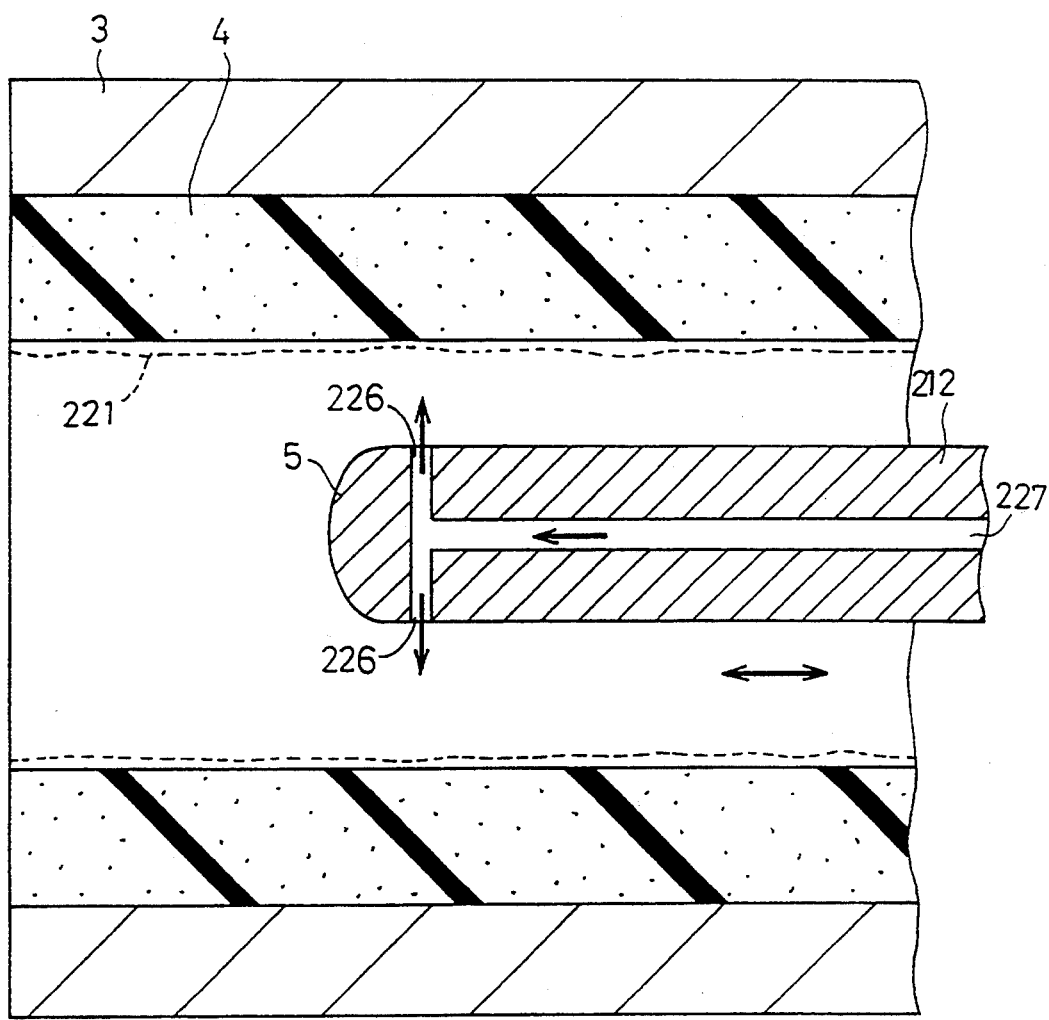
FIG. 19 is an enlarged view showing essential parts of the device of the eighth embodiment.

FIGS. 18 and 19 are views showing an eighth embodiment relating to the die lubricant applying device used in the applying step of liquid-like die lubricant in the method for manufacturing a curved rubber pipe.

In FIG. 18, a nozzle arm 212 is provided integrally with and extends from the nozzle 5 which is inserted into the hollow portion of the rubber semi-finished product 4 and which extends outside the guide member 3.

On the other end of the nozzle arm 212, an injection head 213 is provided which is connected to a leading end of an extensible arm 214. The extensible arm 214 is extendable and retractable by means of a plunger 215, and with its extension and contraction, the nozzle arm 212 advances and retracts in the hollow portion of the rubber semi-finished product 4 in the axial direction, so that the nozzle 5 is designed to move in the axial direction.

The injection head 213 is connected to a liquid chamber 218 side of a plunger type, fixed quantity machine 217 through a flexible tube 216. The liquid chamber 218 for die lubricant is connected with a tank 220 through a valve 219.

The die lubricant 221 in the liquid chamber 218 is pushed by a piston 222, and the required amount corresponding to a displace amount of the piston 222 is delivered to the injection head 213 at a compressed condition through the flexible tube 216. Further, the die lubricant 221 is fed from the injection head 213 to the nozzle arm 212 via the nozzle 5, and is discharged from the nozzle 5.

The valve 219 is a one way valve which can supply the die lubricant 221 from the tank 220 to the liquid chamber 218. The valve is closed when a pressure in the liquid chamber 218 is higher than the required pressure and is opened when the pressure is lower than the required pressure.

The displacement of the piston 222 is performed by allowing one end of a piston rod 223 extending from the piston 222 to the outside of the fixed quantity machine 217 to be advanced and retracted by a suitable driving device 224 such as a hydraulic plunger.

Further, at a middle portion between the fixed quantity machine 217 of the piston rod 223 and the driving device 224, a fixed quantity adjusting member 225 is provided for limiting the displacement of the piston 222 by abutting a wall of the fixed quantity machine 217.

The fixed quantity adjusting member 225 is displaceable in the axial direction of the piston rod 223 to change a distance between the quantitative adjusting member 225 and the piston 222, whereby it is possible to adjust a fixed quantity of the die lubricant 221 supplied to the nozzle 5 according to a compression degree of the piston 222.

FIG. 19 is an enlarged view showing the nozzle 5 forming a discharge port 226 which faces an inner surface of the rubber semi-finished product. In the axial direction of the nozzle arm 212, a supply passage 227 communicating with the discharge port 226 is formed at one end. The other end of the supply passage 227 is connected to the injection head 213 (FIG. 18).

The following description is made about the applying method performed by using the device of the eighth embodiment. In FIG. 18, the nozzle 5 and the nozzle arm 212 are first inserted in the hollow portion of the rubber semi-finished product 4 supported in-the hollow portion of the guide member 3.

Continuously, when the required amount of the die lubricant is supplied from the fixed quantity machine 217 to the injection head 21 at the compression condition through the flexible tube 216, the die lubricant 221 is discharged, as shown in FIG. 19, from the discharge port 226 to the inner surface of the rubber semi-finished product 4 through the supply passage 227.

Then, when the extensible arm 214 of the plunger 215 is extended and contracted, the nozzle arm 212 integral with the arm 214 is advanced and retracted in the rubber semi-finished product 4, whereby the nozzle 5 is displaced in the hollow portion of the rubber semi-finished product 4 in the axial direction. As a result of this, the inner surface of the rubber semi-finished product 4 is applied with the die lubricant over the entire length thereof. For this reason, it is possible to automate the application of the die lubricant. Furthermore, since the dripping out treatment of the die lubricant is unnecessary, it makes it possible to significantly improve the operating efficiency of the applying step.

Also, the die lubricant is difficult to spill on the floor surface, and the tank 220 can be hermetically sealed. Also, the dispersion amount of the die lubricant to the circumference can be lessened because the application is performed in the inner surface of the rubber semi-finished product 4. It is therefore possible to have a better operating environment and to reduce the cost associated with draining treatment. Furthermore, the application of the die lubricant can be limited only to the inner surface of the rubber semi-finished product. Since the outer surface does not receive lubricant, excessive application as in the prior art can be avoided and the operation is economical.

Figure 20:
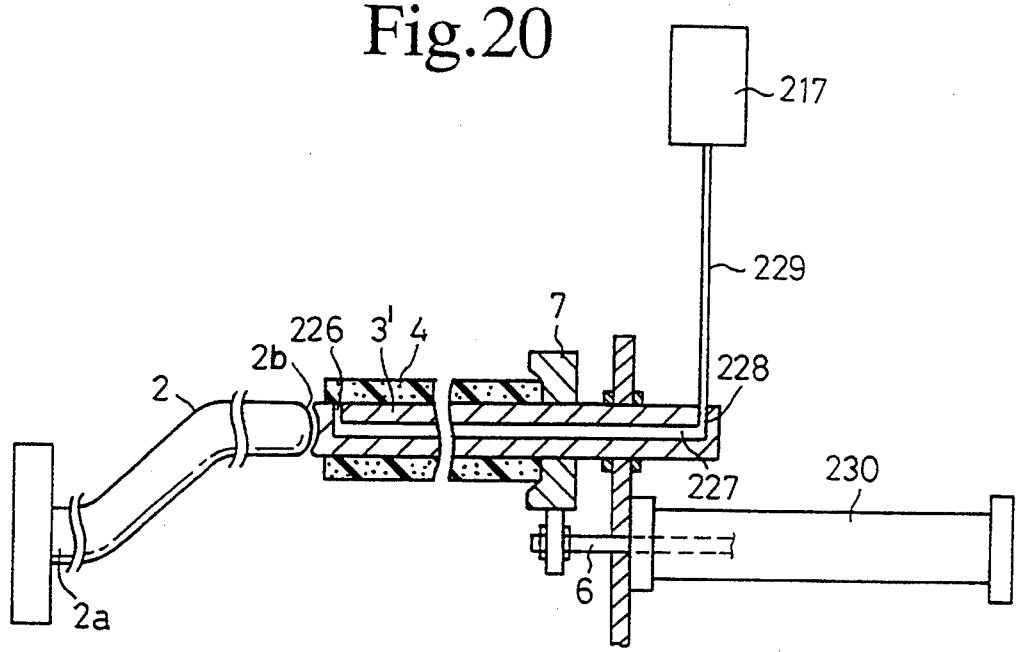
FIG. 20 is a schematic view showing a die lubricant applying device using a method of applying die lubricant of a ninth embodiment.
Figure 21:
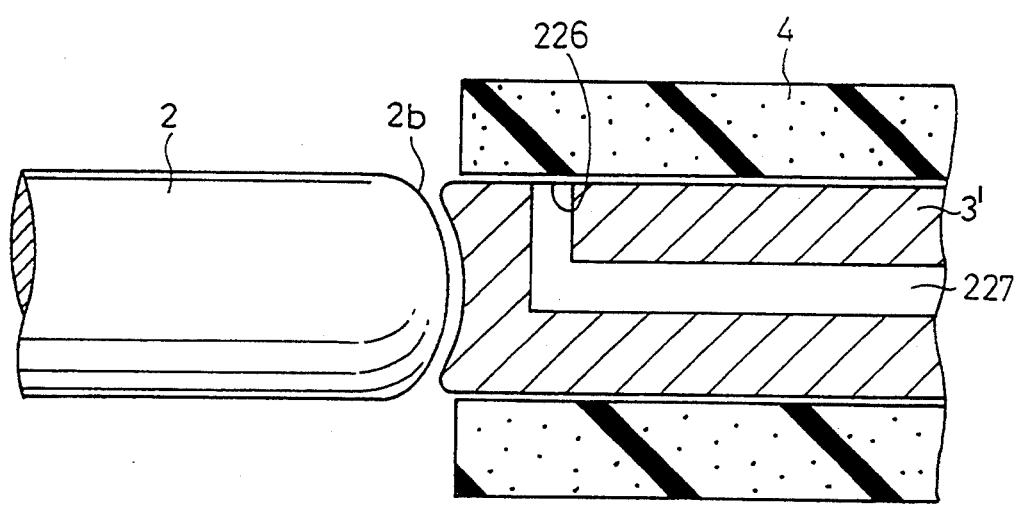
FIG. 21 is an enlarged view showing essential parts of the device of the ninth embodiment.

FIGS. 20 and 21 explain a ninth embodiment of the die lubricant applying device used in the step for applying the liquid die lubricant relating to the method for manufacturing the curved rubber pipe. As shown in FIG. 20, in the ninth embodiment, the guide member is provided inside the rubber semi-finished product 4 and serves as a nozzle. That is, the guide member 3' is a somewhat thinner linear member than the inner diameter of the rubber semi-finished product 4 and is arranged concentrically with the mandrel 2.

At one end of the guide member 3' near a side end portion of the free end 2b of the mandrel 2, a discharge port 226 is oriented to the inner surface of the rubber semi-finished product. A supply passage is formed in the axial center of the guide member 3' which communicates between the discharge port 226 and an injection passage 228 formed radially in the other end of the guide member 3'.

The injection passage 228 is connected to the die lubricant supply side of the fixed quantity machine 217 via a pipe 229. The fixed quantity machine 217 is similar to the eighth embodiment. The head 7 for pushing the end surface opposite to the mandrel side of the rubber semi-finished product 4 is fitted on the outer periphery of the guide member 3' and is connected to the extensible arm 6 of a plunger 230.

Then, the die lubricant is fed under pressure from the fixed quantity machine 217 to the discharge port 226 via the pipe 229 and the injection passage 228 so as to discharge from the discharge port 226. The arm 6 is expanded to allow the head 7 to be moved to the mandrel 2 side. Thus, the rubber semi-finished product 4 is pushed out to the mandrel 2 side and at the same time the die lubricant is applied to the inner surface of the rubber semi-finished product 4 immediately before fitting it on the mandrel 2.

Accordingly, with this method, it is unnecessary to provide the nozzle separate from the guide member 3', and since the latter remains fixed, the device for applying the die lubricant can become simple in its structure. Furthermore, since it is possible to fit the rubber semi-finished product 4 on the mandrel 2 and at the same time, to apply the die lubricant, the operating efficiency can be further improved.

Figure 22:
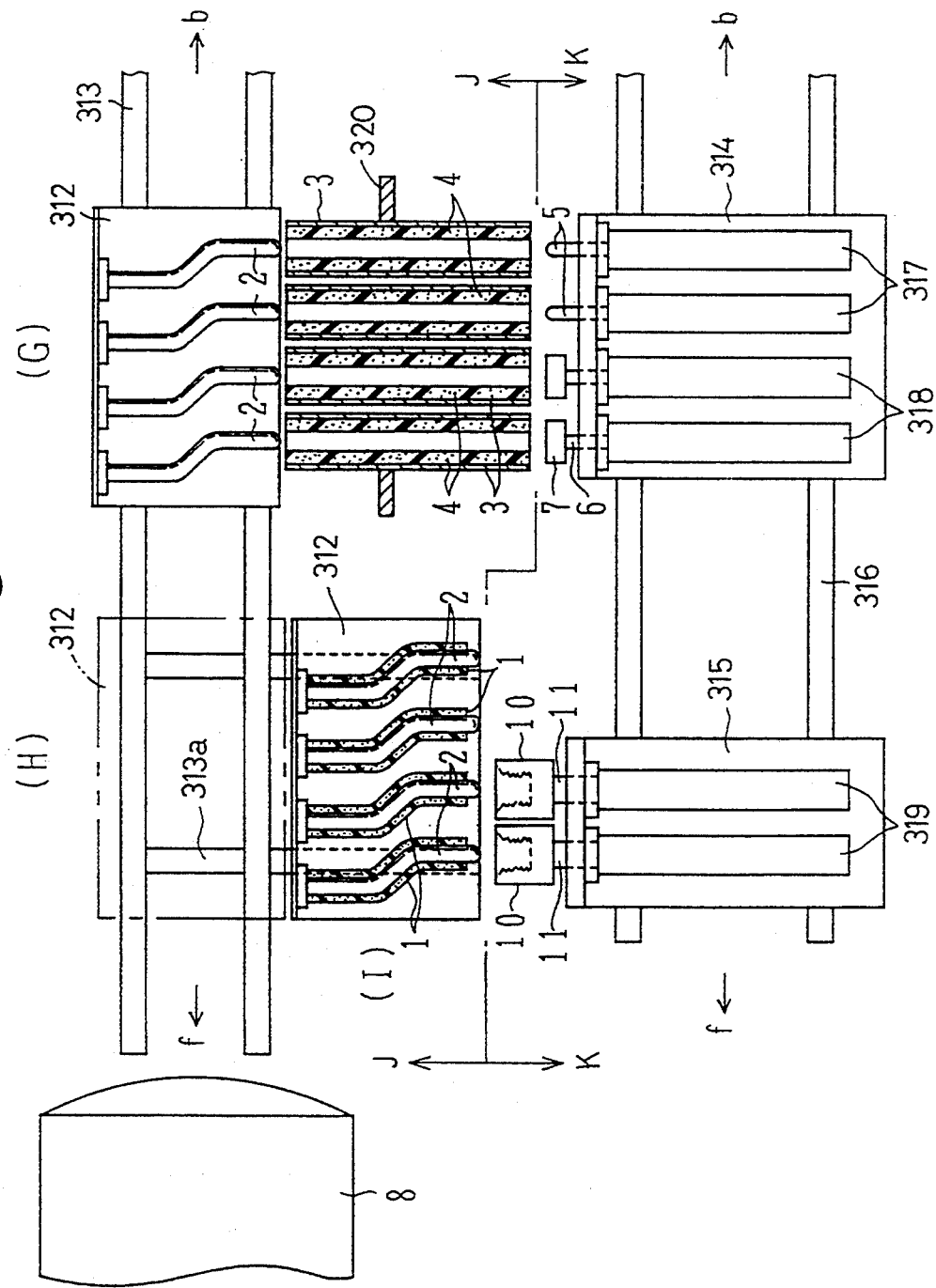
FIG. 22 is a plan view showing a tenth embodiment during simultaneous shaping of a plurality of pipes.
Figure 23:
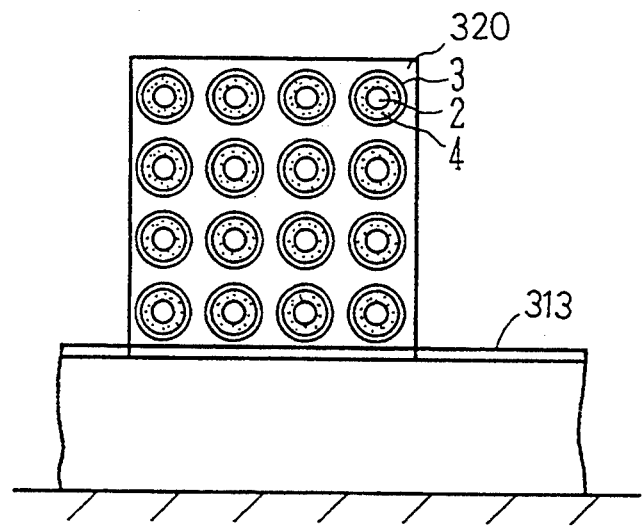
FIG. 23 is a view showing essential parts in a direction of arrow J in FIG. 22 at a first position.
Figure 24:
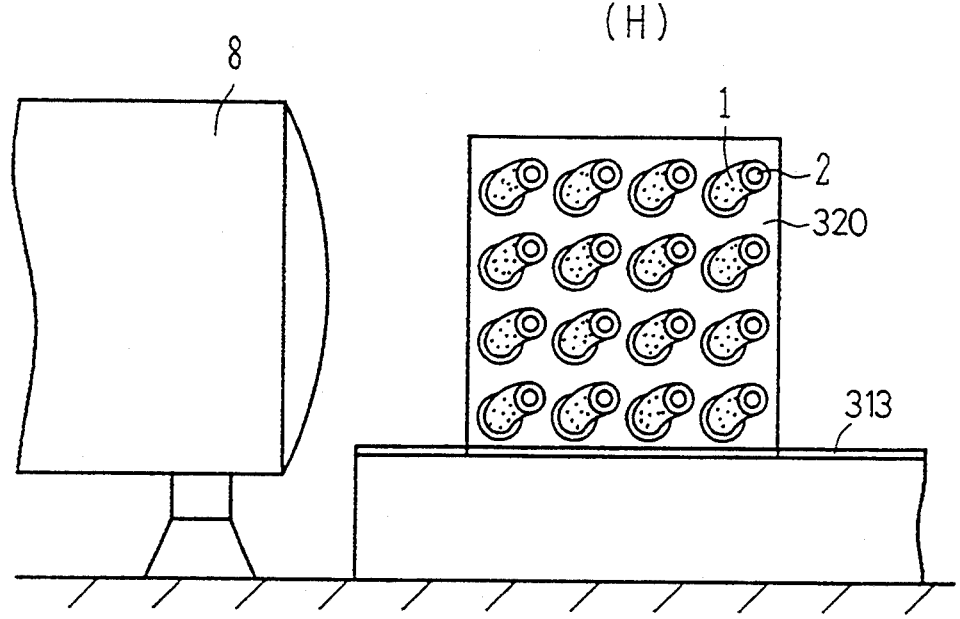
FIG. 24 is a view showing essential parts in a direction of arrow J in FIG. 22 at a second position.

FIGS. 22 to 24 explain a device for simultaneously shaping a lot of curved rubber pipes. These FIGS. 22 to 24 are a tenth embodiment used in the present manufacturing method. As shown in FIG. 22, the manufacturing device is constituted by mandrel bases 312, guide rails 313, a first work stand 314, pushing and die lubricant applying means supported on the first work stand, a second work stand 315, an extracting device supported on the second work stand 315, work stand rails 316, the guide member 3 and a vulcanizing device 8.

A plurality of mandrel bases 312 are used, on each of which a plurality of rows of mandrels 2 are mounted at each base portion 2a. The mandrel base can advance and retract from the vulcanizing device 8 on the guide rails 313 built toward the vulcanizing device 8.

In the following description, the displacement direction of the mandrel base 312 shows at character "f" a direction advancing toward the vulcanizing device 8, and at "b" a direction retracting from it.

The mandrel base 312 is able to occupy a first position (G) in the fitting step and a second position (H) for the extracting step, as fundamental positions by being displaced on the guide rails 313. Further, the mandrel base 312 is capable of moving on siding rails 313a toward a siding position (I) provided between the guide rails 313 and the work stand rails 316. The siding rails 313a are connected at one end thereof to the guide rails 313 at the second position (H) and intersect the guide rails 313, and the other end extends near the work stand rails 316 bin the siding position I.

Further, in FIG. 22, two mandrel bases 312 are shown in a condition separately displaced between the first position (G) and the siding position (I). At the first position (G), the guide members 3 corresponding to the mandrels 2 are arranged concentrically with the axis of the mandrel 2.

The first work stand 314 and the second work stand 315 can be displaced on the work stand rails 316 parallel to the guide rails 313, the guide member 3 being arranged between the guide rails 313 and the work stand rails 316. On the first work stand 314, plungers 317, 318 are mounted with their axial direction coinciding with the guide member 3. On the plunger 317, the nozzle 5 is extensibly provided.

Accordingly, the rubber semi-finished products 4 can simultaneously be gripped by the plural guide members 3 (two rows on a right side of FIG. 22 in the tenth embodiment) and the operation which applies the die lubricant to the inner surfaces of the products 4 by the nozzle 5 can be simultaneously carried out. Also, the operation which pushes out the other part (two rows on a left side of FIG. 22 in the tenth embodiment) by means of the arm 6 and the head 7 can be done at the same time.

Further, as mentioned hereinafter, the mandrel is provided at plural steps, and also the plungers 317,318 corresponding to the mandrels have plural steps, respectively.

The second work stand 315 can be displaced up to the vicinity of the siding position (I). On the stand, plungers 319 parallel to the plungers 317, 318 are provided. The arm 11 extends from each leading end of the plungers 319.

The gripping member 10 mounted on the leading end of each arm 11 can grip the periphery of the end of the curved rubber pipe 1 fitted on the mandrel 2 on the mandrel base 312 lying on the second position (H), when the arm 11 is extended toward the second position (H).

The number of steps of the plunger 317, 318, 319 corresponds to the number of steps of the mandrel 2, but the number of rows may be set arbitrarily within a scope of the number of rows of the mandrel 2.

FIGS. 23 and 24 are views seen from a direction of arrow-J of FIG. 22. As is apparent from FIG. 23, the mandrels and the guide member 3 are provided with the same numbers and the plural rows in a lateral direction and with the plural steps in upper and lower directions, respectively. However, these numbers can arbitrarily be set. Further, the guide member 3 is supported on a stationary frame 320.

FIG. 24 shows a condition immediately after vulcanizing in which the mandrel base 312 removed from the vulcanizing device 8 has been displaced to the second position (H). The curved rubber pipe 1 is fitted on the periphery of each mandrel 2 at a condition fixed in its shape with the vulcanization.

Figure 25:
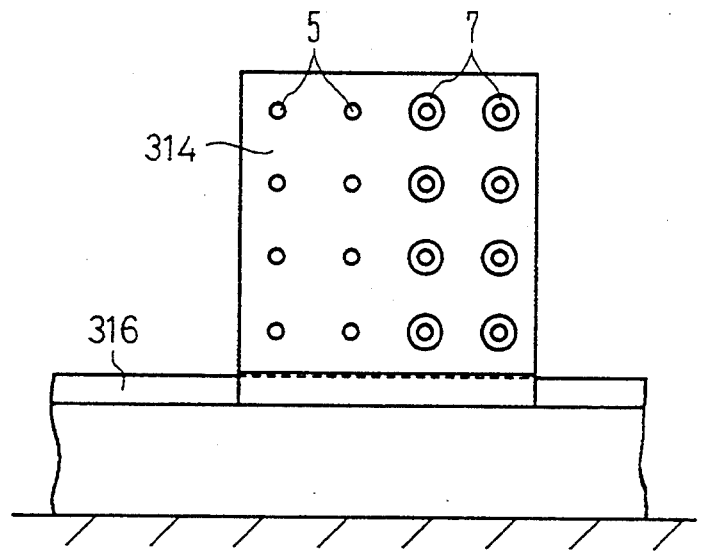
FIG. 25 is a view showing essential parts in a direction of arrow K in FIG. 22 at a first position.
Figure 26:
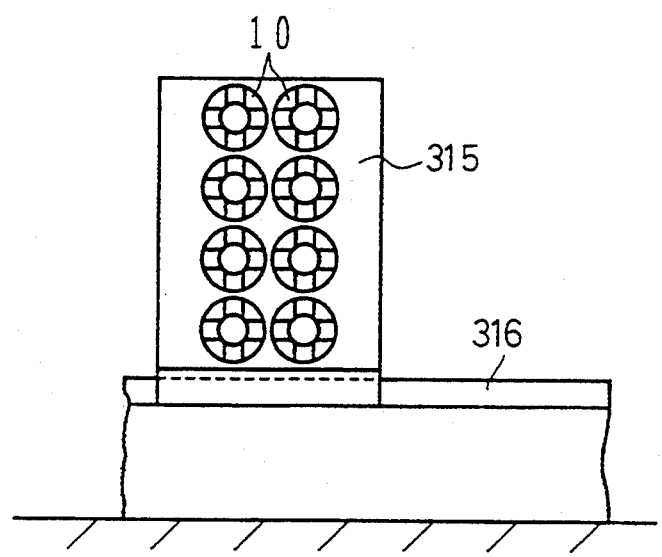
FIG. 26 is a view showing essential parts in a direction of arrow K in FIG. 22 at a second position.

FIGS. 25 and 26 are views seen from a direction of arrow K in FIG. 22, and as apparent from these Figures, the nozzle 5, the head 7 and the gripping member 10 are provided in the same number of steps as that of the mandrel 2 in the upper and lower directions.

The following description is made about the tenth embodiment. In FIG. 22, first of all, when the one mandrel base 312(a) ((a) is added for distinction made likely hereinafter) is displaced to the first position (G). Each mandrel 2 and the guide members 3 are arranged on the same axis.

The rubber semi-finished product 4 is then inserted in the guide members 3 and further, the first work stand 314 is displaced so that the nozzles 5 become concentric with the two rows of guide members 3 of the left side in FIG. 22, and the nozzles 5 are expanded by the plunger 317 to be inserted into the rubber semi-finished product 4. The die lubricant is then applied to the inner surface of the rubber semi-finished product 4.

Thereafter, the first work stand 314 is displaced in the direction of arrow "b" in FIG. 22 and the nozzles 5 are adapted to align with the remaining two rows of guide members 3 of the right side, and the head 7 is adapted to align with the two rows of guide members 3 of the left side.

In this condition, if the plungers 317, 318 are displaced simultaneously and the nozzle 5 and the arm 6 are extended, the nozzles 5 apply the die lubricant to the inner surfaces of the rubber semi-finished products 4 of the two right rows, and at the same time, the arm 6 pushes one end of the rubber semi-finished product 4 since the heads 7 enters into the two guide members 3 of the left side.

The rubber semi-finished product 4 pushed by each of the heads 7 is supported freely to be displaced in a direction of its length to the inside of the guide member 3. Because the axis of the latter coincides with that of the mandrel 2, the product 4 is not bent by buckling on this side of the mandrel and is pushed out and fitted on the periphery of the mandrel 2. Thereafter, if each of the heads 7 is retracted and the first work stand 314 is again displaced in the direction of arrow "b" so as to push the rubber semi-finished products 4 of the two right remaining rows, all of the rubber semi-finished products 4 are fitted on the mandrels 2.

During this, the other mandrel base 312 ((b) is added for distinction made likely hereinafter) is displaced to the second position (H) out of the vulcanizing device 8 after completing the vulcanizing step and the extracting step is advanced simultaneously.

In this time, the second work stand 315 is displaced up to a position near the mandrel base 312(b) on the work stand rails 312, and the gripping members 10 constituted by two rows become in positions corresponding to the curved rubber pipes 1 at the left two rows of the mandrel base 312. In this position, the arm 11 is extended by actuation of the plunger 319 and the periphery of the end portion of the curved rubber pipe 1 is gripped by the gripping member 10. Then, if the arm 11 is retracted in the axial direction of the mandrel 2, the curved rubber pipe 1 gripped by the gripping member 10 is extracted from the mandrel 2.

After this, if the second work stand 315 is displaced in the direction of arrow "b", it is possible to successively extract the curved rubber pipes 1 of the two right rows in the same manner.

When completing the extracting step, the mandrel base 312(b) is displaced on the siding rails 313a up to the siding position (I), and the mandrel base 312(a) is displaced on the guide rails 313 in the direction of arrow "f" so as to enter into the vulcanizing device 8 thereby vulcanizing the rubber semi-finished product 4 on the mandrel 2.

The mandrel base 312(b) of the siding position (I) is displaced to the first position (G) again on the guide rails 313 via the second position when the mandrel base 312(a) is still in the vulcanizing device 8 and enters into the fitting step.

Thereafter, the mandrel base 312(a) is removed from the vulcanizing device 8 after completing the vulcanizing step and is displaced to the second position (H) so as to enter the extracting step. In this time, front and rear positions of the mandrel bases 312(a) and (b) are replaced with each other on the guide rails 313.

After this, by repeating the operations mentioned above, the continuous shaping is enabled by the two mandrel bases 312(a) and (b). Further, the displacements of the mandrel bases 312(a) and (b), the first work stand 314 and the second work stand 315, as well as the operations of the plungers 317, 318 and 319 can manually or automatically be controlled.

Thus, by fitting the rubber semi-finished product 4 via the guide member 3, the fitting of the rubber semi-finished product 4 to the mandrel 2 becomes smooth and it is possible to significantly shorten the operating time. Furthermore, it is possible to improve operating efficiency by adopting automation.

Also, since the die lubricant is applied only on the inner surface of the rubber semi-finished product 4 during the fitting step by the nozzle 5, it is possible to omit the application of lubricant to unnecessary portions, such as the outer surfaces. The operation is economical and healthy and by automation, the operating efficiency is improved.

Further, since it is designed to extract the curved rubber pipe 1 remaining at a relatively high temperature immediately after vulcanizing by gripping the pipe 1 by the gripping member 10, the operator can be released from the severe operating environment having the high temperature and high humidity. Since it is unnecessary to take frequent rest times during operation, and the operation can continuously be performed over a long time, the shaping cycle becomes short and the operating efficiency is improved significantly.

Furthermore, since the die lubricant applying step, the fitting step, the vulcanizing step and the extracting step can be preformed continuously, the shaping time is shortened significantly and can be automated. The process is therefore suitable for mass production.

Also, even if the mandrel 2 and guide member 3 are provided in plural rows and plural steps, and further a plurality of mandrel bases are used, such as 312(a) and (b), each mandrel base is capable of performing simultaneously a separate step by providing the siding position (I), and since the front and rear positions of each of the mandrel bases 312(a) and (b) can be replaced, they can circulate continuously in each step. Therefore, the plural mandrel bases 312 can be used simultaneously. The performance of the bulk production is therefore improved.

Figure 27:
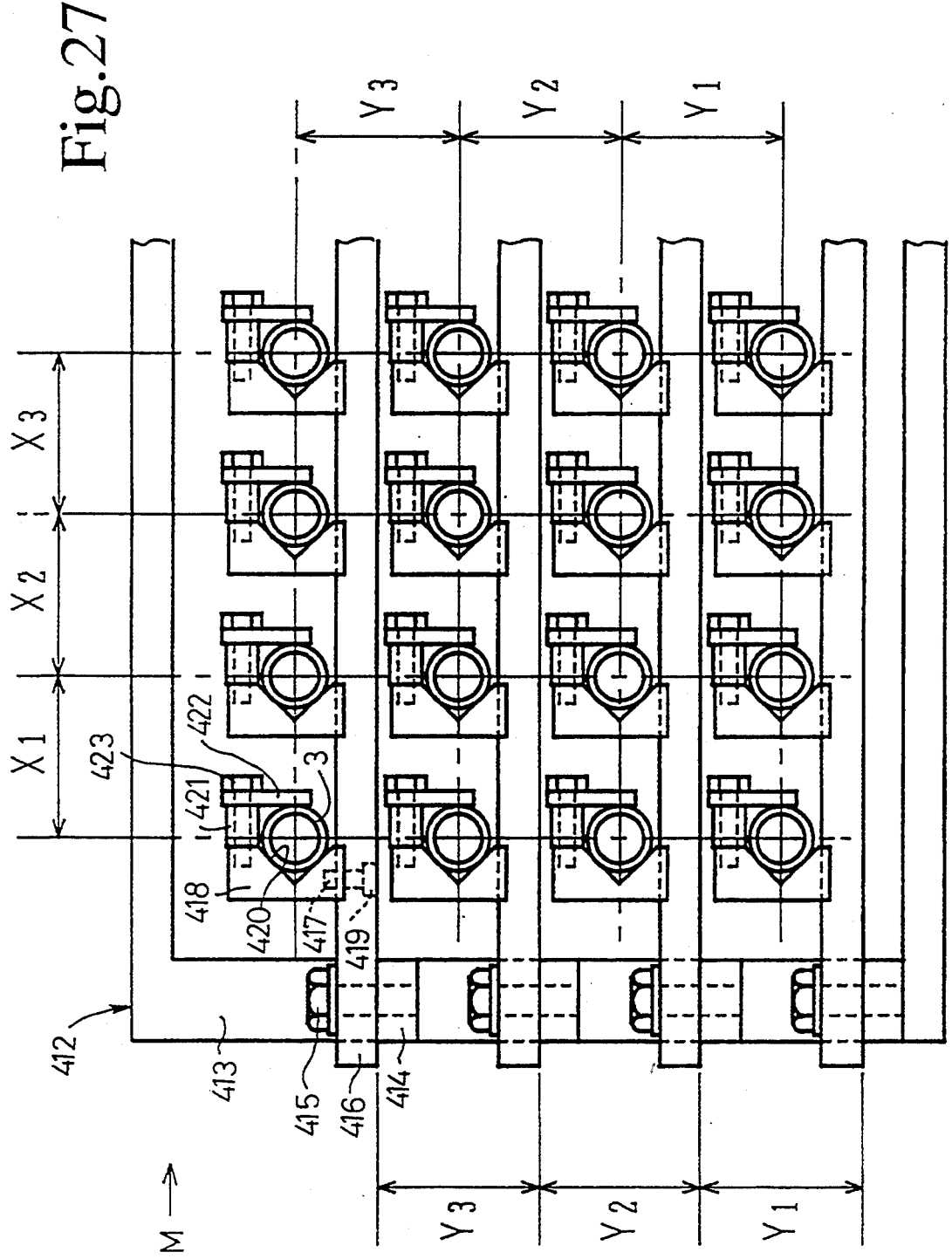
FIG. 27 is a front elevation showing a supporting base portion of a base for a guide member of a eleventh embodiment for simultaneously shaping a plurality of pipes.
Figure 28:
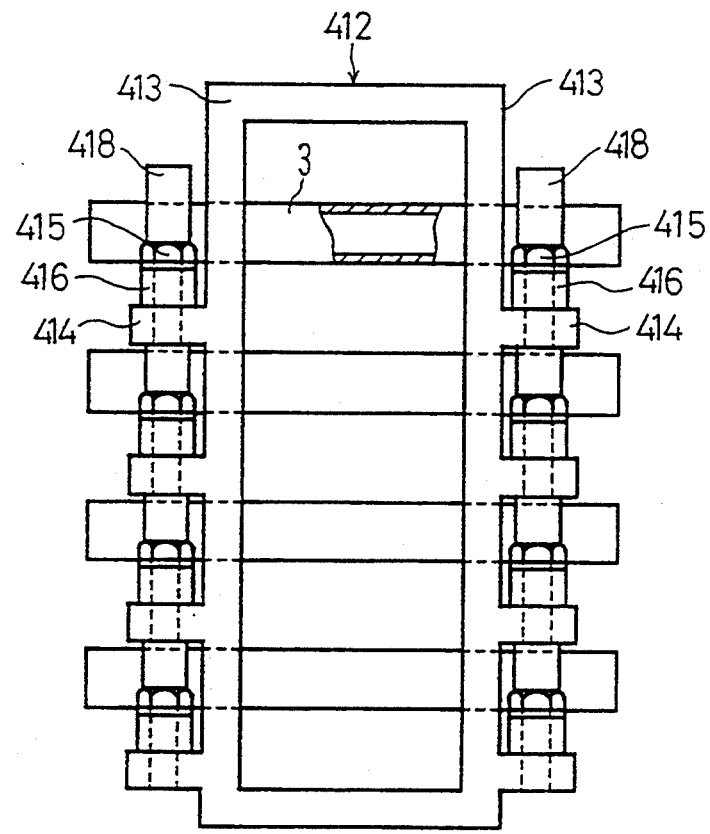
FIG. 28 is a side view partially cut away showing the supporting base of the guide member of the eleventh embodiment.

On the basis of FIGS. 27 to 38, one embodiment is explained with respect to the guide member and the mandrel base of the device for shaping simultaneously a plurality of curved rubber pipes. FIGS. 27 to 31 show an eleventh embodiment with respect to the mounting of the guide member 3. In these Figures, FIG. 27 is a partial front view showing a supporting base 412 for the guide member, and FIG. 28 is a side view (seen in a direction of arrow M in FIG. 27).

In these Figures, the supporting base 412 for the guide member is a member forming a quadrate frame in left and right directions thereof (radial direction of the guide member 3, see FIG. 27), as well as front and rear directions (length direction of the guide member 3, see FIG. 28). Mounting seats 414 are formed at distances Y1, Y2, Y3 in upper and lower directions of each left and right frame 413 (its right side is omitted in FIG. 27), and one end of a supporting plate 416 is fixed by means of bolt 415.

The supporting plate 416 is suspended between the left and right frames 413 of both sides, grooves 417 are formed in the upper surface thereof at distances X1, X2, X3, a lower end portion of a V-block 418 is fit into this groove 417 and is fixed by a bolt 419.

The V-block 418 is used to direct a V-groove 420 in a lateral direction. When fitting the guide member 3 in the V-groove 420, an upper end portion of a holding plate 422 is fixed on an upper end portion of the V-block 418 through a collar 421 having a length about equal to the radius of the guide member 3 and by a bolt 423.

The supporting plate 416, the V-block 418, the collar 421, the holding plate 422 or the like are one embodiment of positioning means according to the present invention. As is apparent from FIG. 28, they are provided similarly in the front and rear directions. Then, when the guide member 3 is mounted on the V-block 418, each central position is always positioned positively at the distances X1, X2, X3 in the left and right directions and Y1, Y2, Y3 in the upper and lower directions.

Also, even if the outer diameter of each guide member 3 differs, the distance of respective central position, always, remains constant. Accordingly, if this central position coincides previously with each central position of a free end 402b of each mandrel 402, each guide member 3 can be centered with high precision to coincide with the axis of the mandrel 402. The mounting of the guide member 3 becomes rapid and simple, whereby the operation of centering and mounting can be improved significantly.

Figure 29:
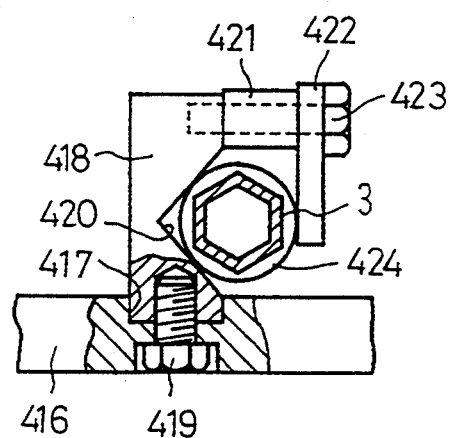
FIG. 29 is an enlarged, partially cut away view showing a portion of a twelfth embodiment.

FIG. 29 is a twelfth embodiment showing a mounting manner in the case that the guide member 3 has a non-circular cross section. In such a case, a circular ring 424 is mounted on the periphery of the guide member 3. The positioning is similar to that of the circular cross section.

Figure 30:
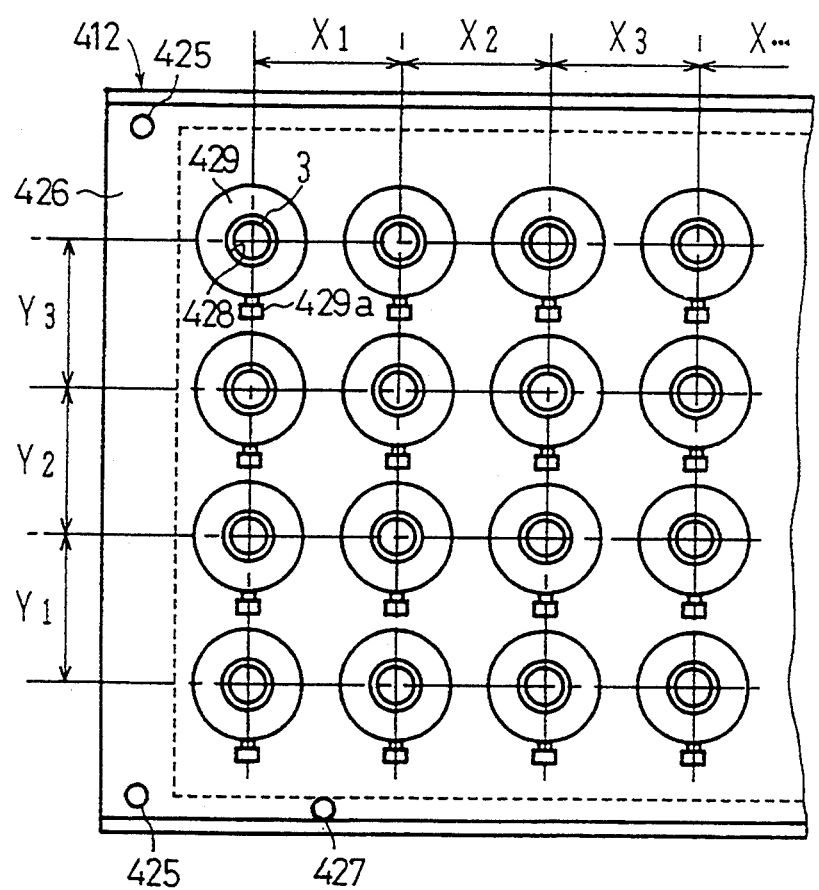
FIG. 30 is a partial front elevation corresponding to FIG. 27 showing essential parts of a guide member of a thirteenth embodiment.
Figure 31:
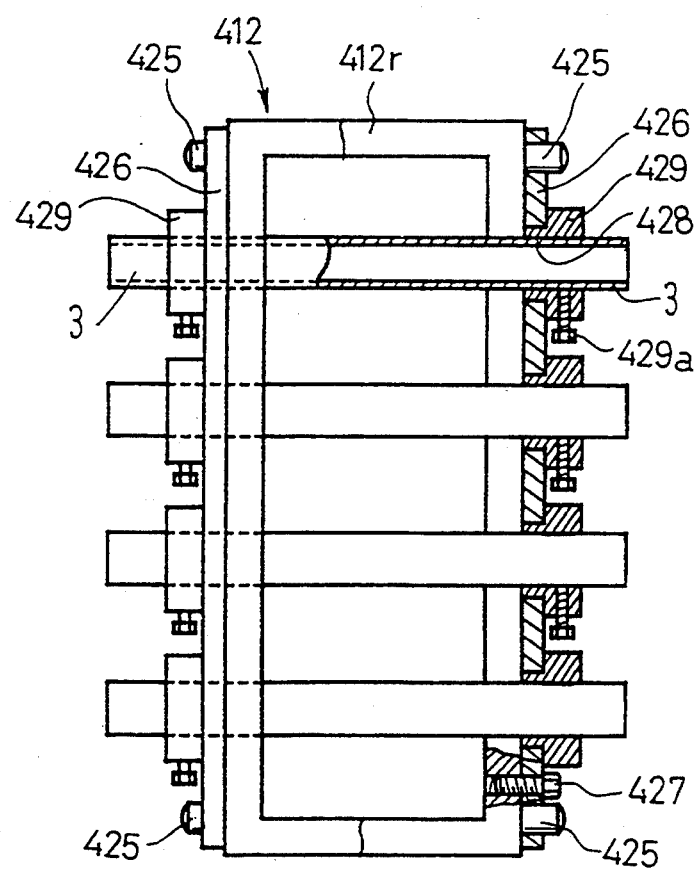
FIG. 31 is a partially cut away side view corresponding to FIG. 28 showing essential parts of the guide member of the thirteenth embodiment.

FIGS. 30 and 31 are views showing another positioning means which is a thirteenth embodiment, FIG. 30 corresponding to FIG. 27 and FIG. 31 to FIG. 28, respectively. Pins 425 are formed to project from the front and the rear at four front and rear corners of the supporting base 412 similar to the twelfth embodiment. On the pins, each corner portion of a pair of front and rear supporting plate 426 are engaged. The pin is fixed to the supporting base 412 by a bolt 427. Further, FIG. 31 is cut away at its right side, whereby the right side of the supporting base 412 can be seen.

Each of the supporting plates 426 has an area of a degree being capable of covering the front surface of the rear surface of the supporting base 412, respectively. A plurality of circular bores 428 are formed so that the central position is at distances X1, X2, X3 in the left and right directions and Y1, Y2, Y3 in the upper and lower direction. Into these bore are fitted bushes 429, an outer diameter of which is a bore diameter of the circular bore 428 and an inner diameter is equal to about the periphery of the guide member 3.

If each of the guide members 3 is extended through each of the bushes 429 of the front and rear supporting plates 426 and each bush 429 and each guide member 3 are secured by means of a set screw 429a, each guide member 3 is always positioned positively at distances X1, X2, X3 in the left and right direction as well as Y1, Y2, Y3 in the upper and lower directions.

Figure 32:
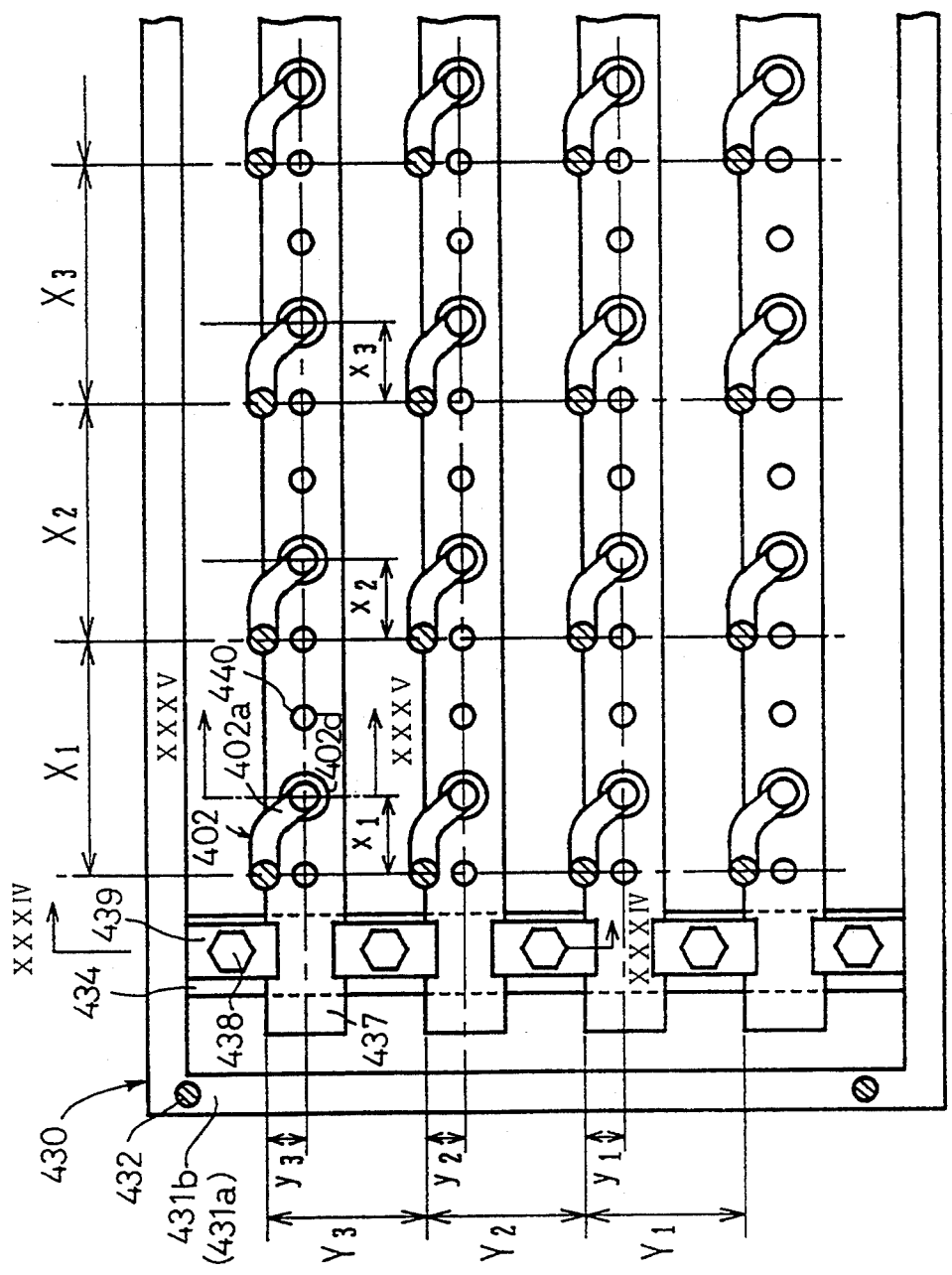
FIG. 32 is a partial cross sectional view taken along line XXXII—XXXII in FIG. 33 of a mandrel base portion of a fourteenth embodiment.
Figure 33:
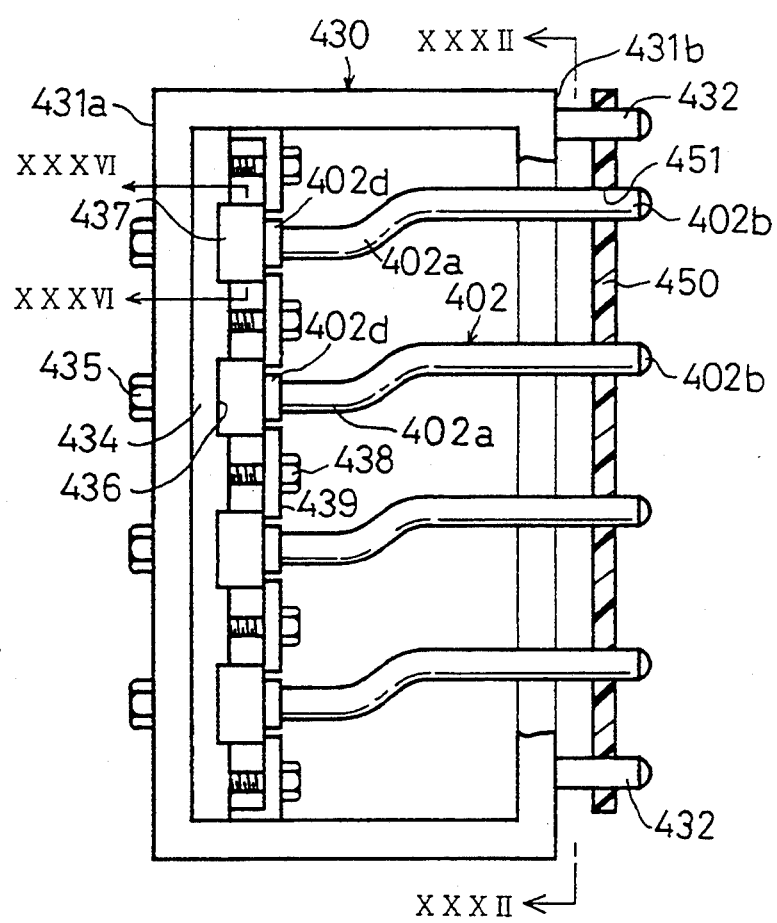
FIG. 33 is a partially cut away side view showing the mandrel base portion of the fourteenth embodiment.
Figure 34:
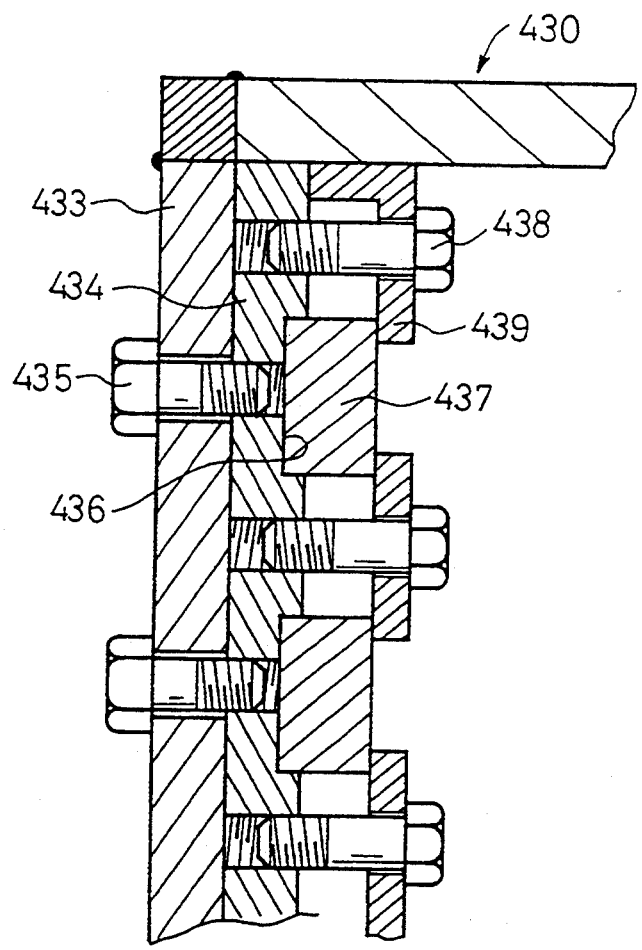
FIG. 34 is an enlarged cross sectional view taken along line XXXIV—XXXIV in FIG. 32.
Figure 35:
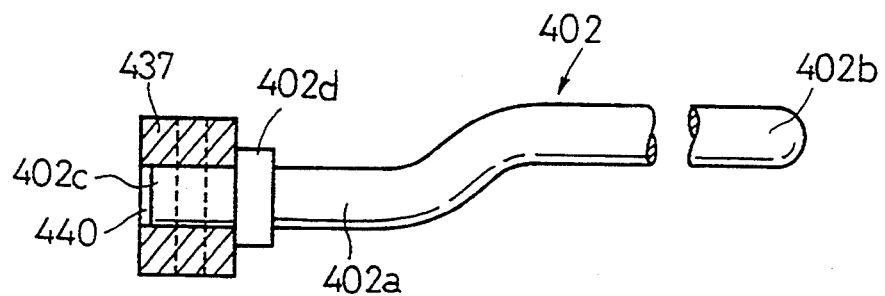
FIG. 35 is an enlarged cross sectional view taken along line XXXV—XXXV in FIG. 32.
Figure 36:
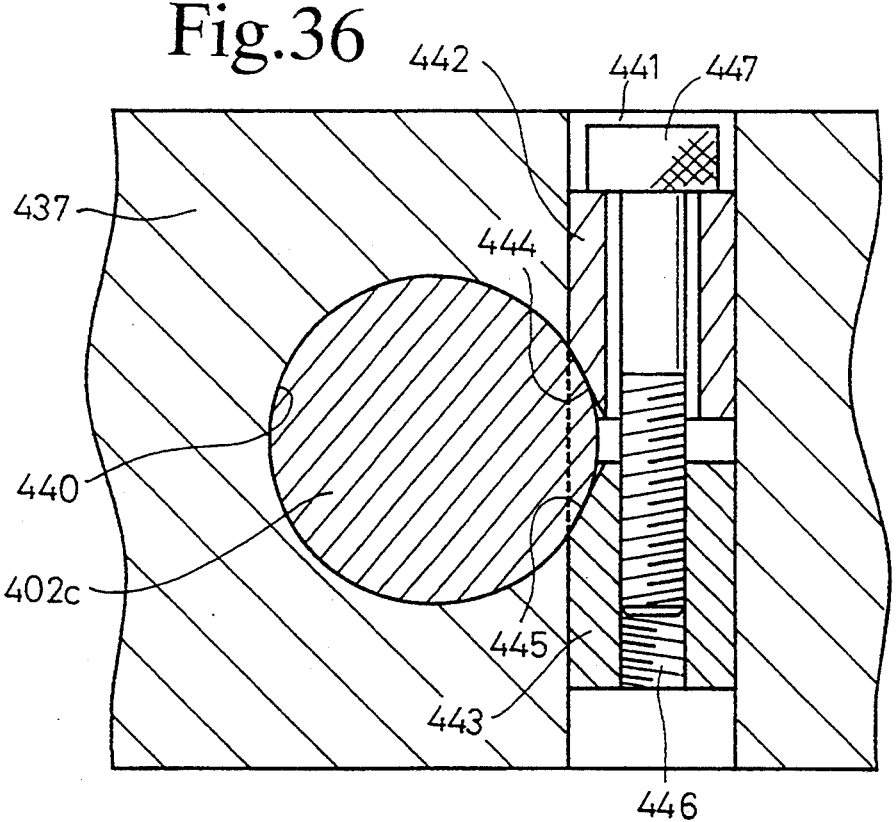
FIG. 36 is an enlarged cross sectional view taken along line XXXVI—XXXVI in FIG. 33.
Figure 37:
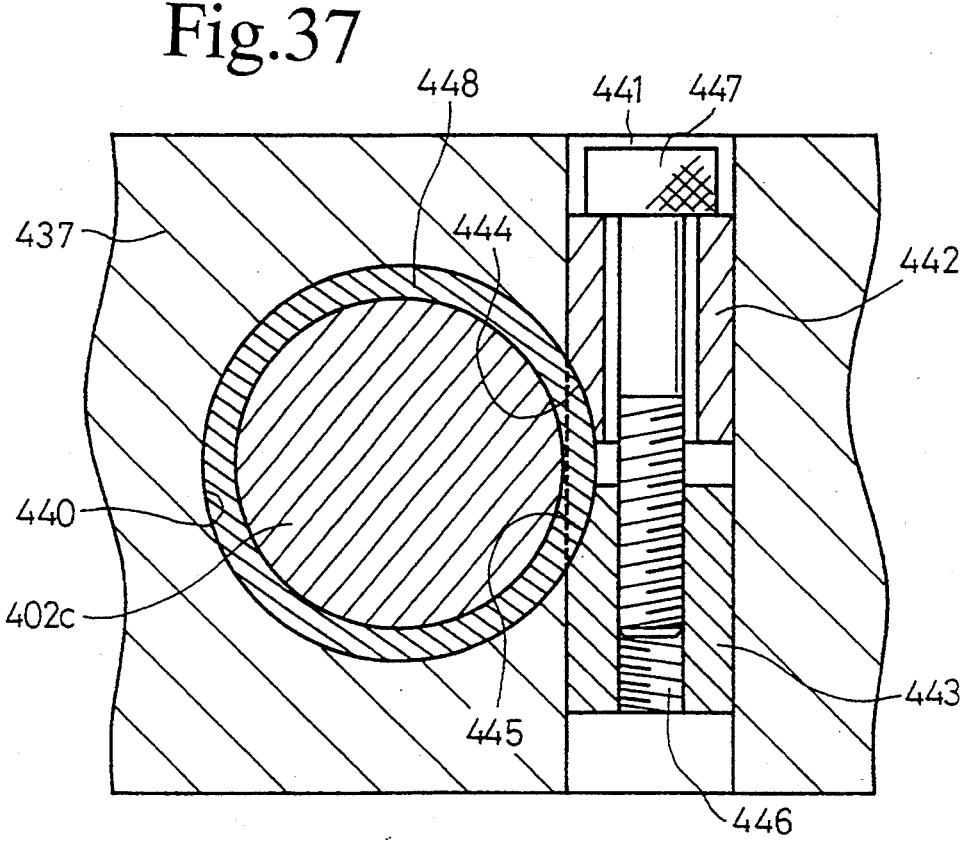
FIG. 37 is a view showing the portion corresponding to FIG. 36 of a fifteenth embodiment.

FIGS. 32 to 38 are views showing a mandrel base 430 in a condition mounting the mandrel 402 of the device for simultaneously shaping a plurality of curved rubber pipes. FIG. 32 is a cross sectional view (cut away in the right side) taken along line XXXII—XXXII in FIG. 33 showing a side view (cut away in the right side) of the mandrel base 430 which is a fourteenth embodiment. FIG. 34 is an enlarged cross sectional view taken along line XXXIV—XXXIV in FIG. 32. FIG. 35 is an enlarged cross sectional view taken along line XXXV—XXXV in FIG. 32. FIG. 36 is an enlarged cross sectional view taken along line XXXVI—XXXVI in FIG. 33. Further, as shown in FIG. 35, the mandrel 402 has a mounting end 402c and a mounting flange 402d at an end of a base portion 402a of the side opposite to a free end 402b.

In these Figures, the mandrel base 430, similarly to the aforesaid supporting base 412 for the guide member is a member forming a quadrate frame in left and right directions thereof (radial direction of the mandrel 402, see FIG. 32), as well as front and rear directions (length direction of the mandrel 402, see FIG. 33). Pins 432 are formed to project to the rear at upper and lower end portions of each left and right frame 431b (FIG. 32 omits the right side) existing in the rear (a direction in which the free end 402a of the mandrel 402 projects).

As apparent from FIG. 34, near each front left and right frame 431a in upper and lower directions, a supporting frame 433 connected to upper and lower end portions of a front side of the mandrel base 430 is provided at both ends thereof. Upper and lower positioning members 434 overlapped on the supporting frame are fixed to the latter by means of a bolt 435. In the supporting frame 433, positioning grooves are equidistantly provided in upper and lower directions, and an end portion of a mounting plate 4.37 is fitted in the positioning groove. The mounting plate is secured by a suppressing plate 439 mounted on the upper and lower positioning member 434 by the bolt 435.

The mounting plate 437 is suspended between the left and right supporting frames 433, and mandrel mounting bores 440 are formed at equidistances in its length direction. A bore diameter of the mandrel mounting bore is somewhat larger than an outer diameter of the mounting end portion 402c, and as shown in FIG. 35, the latter is fitted in the mandrel mounting bore 440. The mounting flange 402d then abuts a surface of the mounting plate 437.

As shown in FIG. 36, in upper and lower directions of a thickness of the mounting plate 437, a through bore 441 intersecting an inner wall surface of the mandrel mounting bore 440 is formed. Tapered surfaces 444, 445 are formed on opposed leading ends of a pair of hollow fixed pins 442, 443 inserted from the upper and lower directions, and a female thread 446 is formed in an axial bore of the lower, hollow fixed pin 443.

Then, the mounting end portion 402c is rotatably fitted into the mandrel mounting bore 440 and a bolt 447 is inserted into the axial bores hollow fixed pins 442, 443 inserted into the through bore 441. When the bolt 447 is tightened, because the opposed leading ends of the hollow fixed pins 442,443 approach each other, and respective tapered surfaces 444, 445 contact forcibly with an outer periphery of the mounting end portion 402c, the latter is secured to the mounting plate 437 to prevent rotation and falling.

Further, in a case that the mounting end portion 402c is of a soft material, it deforms by tightening the bolt 447 and looseness and breakage may occur. Then, in such a case, a hard collar 448 is fitted on the periphery of the mounting end portion 402c, as in a fifteenth embodiment shown in FIG. 37.

Figure 38:
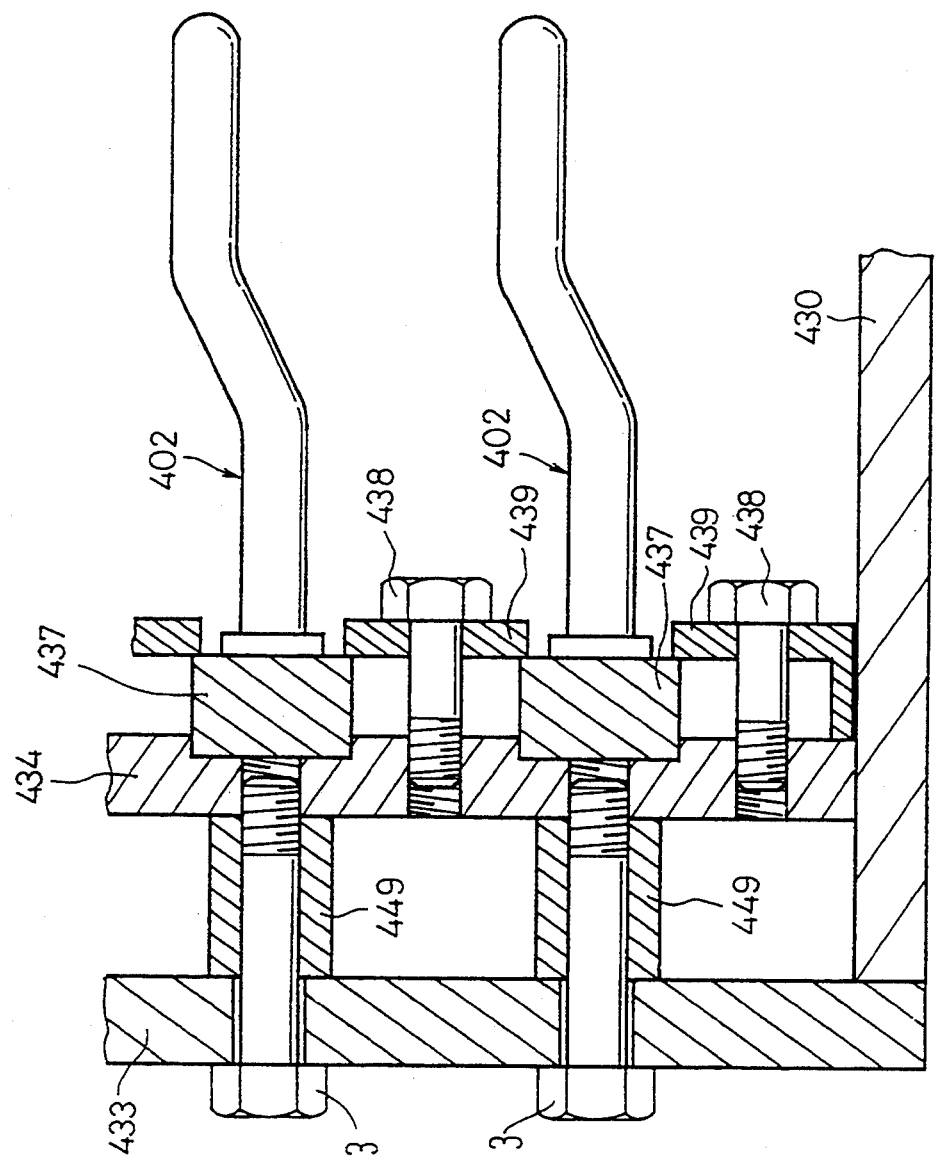
FIG. 38 is a view showing a different example of the portion corresponding to FIG. 34 of a sixteenth embodiment.

FIG. 38 is a sixteenth embodiment showing a mounting manner of the upper and lower positioning member 434 where the mandrel 402 is short in its whole length. In such a case, a relatively long collar 449 is inserted between the supporting frame 433 and the upper and lower positioning member 434 which can be mounted by a long bolt 435.

As shown in FIG. 33, a set plate 450 is engaged on a rear surface of the mandrel base 430 by means of pin 432. In the set plate 450 are formed over the whole surface positioning bores 451 for allowing the free end 402b of the mandrel 2 to pass through it and to position it.

Positions for forming the positioning bore 451 correspond to the position of the free end 402b in FIG. 32, and the central position is formed at the distances X1, X2, X3 in the left and right directions and at the distances Y1, Y2, Y3 in the upper and lower directions, as the distance of the central position of the guide member 3. Further, a mounting central position of the mounting end portion 402c becomes in a position offset from X1, X2, X3 and Y1, Y2, Y3 by x1, x2, x3 and y1, y2, y3, respectively.

Then, as mentioned above, when the mounting end portion 403c is first rotatably fitted into the mandrel mounting bore 440 and the set plate 450 passing the free end 402b into the positioning bore 451 is then engaged with the pin 432 of the rear surface of the mandrel base 430, since the position of the free end 402b is exactly positioned, if the mounting end portion 402c side is fixed at this condition and thereafter the set plate 450 is removed, the mandrel 402 is mounted exactly on the mandrel base 430, and is precisely centered on the same axis of the guide member 3.

Further, in the case that the mandrels having different shapes are included, by using the set plate 450, since the free end 402b can rapidly and simply fix the mounting end portion 402c at an exact position, the centering and mounting operations become very advantageous.

Thus, it makes it possible to satisfy any of the following mounting conditions of the mandrel 402:

1. To exactly position the free end 402b;
2. To resist the pushing force occurring when fitting the rubber semi-finished product 4;
3. To resist a tension force when extracting the curved rubber pipe 1 after vulcanizing; and
4. To resist rotating force when pushing or pulling.

The mandrel can be mounted rapidly and exactly, whereby it is possible to improve the operating performance of the centering and mounting operations to the guide member 3.

Further, the guide member and mandrel base of the device for simultaneously shaping a plurality of curved rubber pipes are not limited to the aforesaid first embodiment to sixteenth embodiment, but is possible to modify in various kinds. For example, the illustrated conditions in respect to the number of the guide member, the number of the positioning means as well as the number of the mandrel corresponding to the number of the positioning means are shown as an example, but they are capable of being freely increased and/or decreased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a curved rubber pipe comprising the steps of:
    providing a rectilinear guide member having an axis;
    placing a generally straight rubber semi-finished product on a curved mandrel, the mandrel having a longitudinal axis and the rubber semi-finished product having an inner surface defining a hollow portion thereof, the step of placing comprises the steps of,
        aligning the axis of the guide member with the axis of the mandrel, and
        pushing the semi-finished product from said guide member onto the mandrel, an end of the semi-finished product opposite the mandrel being pushed during the step of pushing;
    applying a die lubricant only to the inner surface of the rubber semi-finished product from a nozzle inserted into the hollow portion of the rubber semi-finished product, the rubber semi-finished product being supported on the guide member during the step of applying the die lubricant;
    vulcanizing the product fixed in a curved shape to form a rubber pipe by heating and vulcanizing the rubber semi-finished product placed on the mandrel; and
    extracting the vulcanized rubber pipe from the mandrel.

2. The method for manufacturing a curved rubber pipe according to claim 1, wherein the generally straight rubber semi-finished product is one of an unvulcanized and semi-vulcanized rubber and wherein the step of applying a die lubricant applies the die lubricant before the step of placing the rubber semi-finished product on the curved mandrel.

3. The method for manufacturing a curved rubber pipe according to claim 1, wherein the generally straight rubber semi-finished product is one of an unvulcanized and semi-vulcanized rubber and wherein the step of applying a die lubricant applies the die lubricant at a same time as the step of placing the rubber semi-finished product on the curved mandrel.

4. The method for manufacturing a curved rubber pipe according to claim 1, wherein the guide member is tubular and has a hollow portion in which the rubber semi-finished product is supported, the step of applying applies die lubricant while the nozzle is displaced in an axial direction in the hollow portion of the rubber semi-finished product.

5. The method for manufacturing a curved rubber pipe according to claim 1, wherein the guide member has a delivery passage and a discharge port communicating with the delivery passage to thereby form the nozzle, the step of applying includes the step of inserting the guide member into the hollow portion of the rubber semi-finished product, the rubber semi-finished product being pushed off the guide member during the step of pushing.

6. The method for manufacturing a curved rubber pipe according to claim 1, wherein the step of extracting comprises gripping a periphery of one end of the rubber pipe by a gripping member and pulling the rubber pipe along an axial direction of the mandrel.

7. The method for manufacturing a curved rubber pipe according to claim 6, wherein the step of gripping the periphery of one end of the rubber pipe occurs immediately after vulcanizing at a relatively high temperature.

8. A device for manufacturing a curved rubber pipe comprising:
   a rectilinear guide member having an axis, the guide member having a hollow portion which receives a generally straight rubber semi-finished product therein;
   a curved mandrel onto which the rubber semi-finished product is placed, the mandrel having a longitudinal axis and the rubber semi-finished product having an inner surface defining a hollow portion thereof, the axis of the guide member being alignable with the axis of the mandrel;
   pushing means for pushing the semi-finished product from the hollow portion of said guide member onto the mandrel, an end of the semi-finished product opposite the mandrel being pushed by the pushing means; and
   vulcanizing means for forming the product fixed in a curved shape into a rubber pipe by heating and vulcanizing the rubber semi-finished product placed on the mandrel.

9. The device for manufacturing a curved rubber pipe according to claim 8, further comprising means for extracting the vulcanized rubber pipe from the mandrel.

10. The device for manufacturing a curved rubber pipe according to claim 8, wherein the pushing means includes a head portion with a recess, the head portion pushes the end of the semi-finished product opposite the mandrel and the recess receives a free end of the mandrel when the semi-finished product is pushed onto the mandrel.

11. The device for manufacturing a curved rubber pipe according to claim 8, wherein the pushing means includes a head portion with an air passage, the head portion pushes the end of the semi-finished product opposite the mandrel, the air passage in the head portion provides communication between the hollow portion of the semi-finished product and a space outside of the head portion.

12. The device for manufacturing a curved rubber pipe according to claim 8, further comprising centering means provided on a supporting base of the guide member, the centering means aligning the axis of the guide member with the longitudinal axis of the mandrel, the centering means mounting the guide member to the supporting base.

13. The device for manufacturing a curved rubber pipe according to claim 8, wherein the mandrel has a first end and a second end, the first and second ends being opposed, the first end of the mandrel being cantilevered on a mandrel base and wherein the device further comprises positioning means for arranging the second end of the mandrel concentric with the axis of the guide member.

14. A device for manufacturing a curved rubber pipe comprising:
   a rectilinear guide member having an axis, a generally straight rubber semi-finished product being supported on the guide member, the rubber semi-finished product having an inner surface defining a hollow portion, at least a portion of the guide member being covered by the rubber semi-finished product when the guide member is supporting the rubber semi-finished product;
   a curved mandrel onto which the generally straight rubber semi-finished product is placed, the mandrel having a longitudinal axis, the axis of the guide member being alignable with the axis of the mandrel;
   pushing means for pushing the semi-finished product from said guide member onto the mandrel, an end of the semi-finished product opposite the mandrel being pushed by the pushing means, wherein the pushing means includes a head portion with an air passage, the head portion pushes the end Of the semi-finished product opposite the mandrel, the air passage in the head portion provides communication between the hollow portion of the semi-finished product and a space outside of the head portion; and
   vulcanizing means for forming the product fixed in a curved shape into a rubber pipe by heating and vulcanizing the rubber semi-finished product placed on the mandrel.

15. The device for manufacturing a curved rubber pipe according to claim 14, further comprising means for extracting the vulcanized rubber pipe from the mandrel.

16. The device for manufacturing a curved rubber pipe according to claim 14, wherein the head portion has a recess, the head portion pushes the end of the semi-finished product opposite the mandrel and the recess receives a free end of the mandrel when the semi-finished product is pushed onto the mandrel.

17. The device for manufacturing a curved rubber pipe according to claim 14, further comprising centering means provided on a supporting base of the guide member, the centering means aligning the axis of the guide member with the longitudinal axis of the mandrel, the centering means mounting the guide member to the supporting base.

18. The device for manufacturing a curved rubber pipe according to claim 14, wherein the mandrel has a first end and a second end, the first and second ends being opposed, the first end of the mandrel being cantilevered on a mandrel base and wherein the device further comprises positioning means for arranging the second end of the mandrel concentric with the axis of the guide member.

19. A device for manufacturing a curved rubber pipe, comprising:
   a curved mandrel having a removable rubber pipe thereon, the mandrel having a longitudinal axis and a free end over which the rubber pipe is slid, the rubber pipe having a first end and a second end, the first and second ends being opposed ends and the first end being located closer to the free end of the mandrel than the second end;
   a gripping member movable toward and away from the rubber pipe along the longitudinal axis of the mandrel, the gripping member comprising a plurality of pawls which surround a periphery of the rubber pipe, the pawls being generally equally distributed around the periphery of the rubber pipe, each pawl having a sawtooth portion contactable with the rubber pipe, the sawtooth portion being inclined in an extracting direction, the sawtooth portions having a face circle with a diameter smaller than an outer diameter of the rubber pipe, the pawls being pivotable about supporting shafts between an escaping position and a gripping position, the pawls in the escaping position being inclined and the sawtooth portions sliding on the rubber pipe when the gripping member is moved toward the second end of the rubber pipe, the face circle of the sawtooth portions being greater than the outer diameter of the rubber pipe when the pawls are in the escaping position, the pawls in the gripping position biting into the periphery of the rubber pipe when the gripping member is moved away from the second end of the rubber pipe; and force rotating means for forcibly rotating each pawl in the escaping direction before the pawls contact with the rubber pipe.

20. The device for manufacturing a curved rubber pipe according to claim 19, further comprising force opening and closing means for advancing and retracting each pawl in a radial direction of the curved pipe and for changing an opening position wherein the face circle is larger than the outer diameter of the rubber pipe and a biting position wherein the face circle is smaller than the outer diameter of the rubber pipe.

21. The device for manufacturing a curved rubber pipe according to claim 19, further comprising an aligning guide provided on a mandrel side of the gripping member, the aligning guide being provided with a guide bore and a guide surface, the guide bore being concentric with the face circle formed on a leading end of the sawtooth portion of each pawl and the guide surface being inclined in the extracting direction toward the guide bore.

22. A device for manufacturing a curved rubber pipe, comprising:

a curved mandrel having a removable rubber pipe thereon, the mandrel having a longitudinal axis and a free end over which the rubber pipe is slid, the rubber pipe having a first end and a second end, the first and second ends being opposed ends and the first end being located closer to the free end of the mandrel than the second end;

a gripping member movable toward and away from the rubber pipe along the longitudinal axis of the mandrel, the gripping member comprising a plurality of pawls which surround a periphery of the rubber pipe, the pawls being generally equally distributed around the periphery of the rubber pipe, each pawl having a sawtooth portion contactable with the rubber pipe, the sawtooth portion being inclined in an extracting direction, the sawtooth portions having a face circle with a diameter smaller than an outer diameter of the rubber pipe, the pawls being pivotable about supporting shafts between an escaping position and a gripping position, the pawls in the escaping position being inclined and the sawtooth portions sliding on the rubber pipe when the gripping member is moved toward the second end of the rubber pipe, the face circle of the sawtooth portions being greater than the outer diameter of the rubber pipe when the pawls are in the escaping position, the pawls in the gripping position biting into the periphery of the rubber pipe when the gripping member is moved away from the second end of the rubber pipe; and a spring for each pawl, the spring rotating the pawl toward the gripping position.

23. The device for manufacturing a curved rubber pipe according to claim 22, further comprising force opening and closing means for advancing and retracting each pawl in a radial direction of the curved pipe and for changing an opening position wherein the face circle is larger than the outer diameter of the rubber pipe and a biting position wherein the face circle is smaller than the outer diameter of the rubber pipe.

24. The device for manufacturing a curved rubber pipe according to claim 22, further comprising an aligning guide provided on a mandrel side of the gripping member, the aligning guide being provided with a guide bore and a guide surface, the guide bore being concentric with the face circle formed on a leading end of the sawtooth portion of each pawl and the guide surface being inclined in the extracting direction toward the guide bore.

25. A device for manufacturing a curved rubber pipe comprising:

a curved mandrel onto which a generally straight rubber semi-finished product is placed, the mandrel having a free end side and a longitudinal axis;

a vulcanizing device for forming the rubber semi-finished product fixed in a curved shape into a rubber pipe by heating and vulcanizing the rubber semi-finished product placed on the mandrel;

a mandrel base from which the mandrel is cantilevered, the mandrel base being displacable on guide rails toward and away from the vulcanizing device;

a rectilinear guide member having an axis which coincides with the longitudinal axis of the mandrel when the mandrel is in a receiving position, the guide member being arranged along the guide rails at the free end side of the mandrel;

a pushing device for pushing the rubber semi-finished product from the guide member onto the mandrel, the rubber semi-finished product being guided by the guide member, the pushing device being arranged along the guide rails at the free end side of the mandrel; and an extracting device having a gripping member, the extracting device being arranged along the guide rails at the free end side of the mandrel, the extracting device extracting the rubber pipe from the mandrel by displacing the gripping member to grip a periphery of one end of the rubber pipe which has been vulcanized by the vulcanizing device, the extracting device removing the rubber pipe from the mandrel along the longitudinal axis of the mandrel.

26. The device for manufacturing a curved rubber pipe according to claim 25, further comprising means for applying die lubricant to an inner surface of the rubber semi-finished product.

27. The device for manufacturing a curved rubber pipe according to claim 25, further comprising work stand rails which are generally parallel to the guide rails, siding rails, a first work stand and a second work stand, the first and second work stands being freely displacable on the work stand rails, the pushing device being provided on the first work stand, the extracting device being provided on the second work stand, a plurality of mandrel bases being provided with each of the mandrel bases having a plurality of rows and steps of mandrels thereon, one of the siding rails being connected to the guide rails, the siding rails guiding the mandrel bases to a siding position provided between the guide rails and the work stand rails.

28. The method for manufacturing a curved pipe according to claim 3, wherein the step of applying a die lubricant discharges the lubricant from at least one discharge port on a side of the guide member, the lubricant being applied to the inner surface of the rubber semi-finished product while the rubber semi-finished product is being pushed onto the curved mandrel, the rubber semi-finished product moving past the at least one discharge port during the step of pushing, the lubricant being applied to the rubber semi-finished product immediately before the product is placed on the curved mandrel.

* * * * *